E

United States Patent
Tsuria et al.

(10) Patent No.: US 7,124,426 B1
(45) Date of Patent: Oct. 17, 2006

(54) ENTERTAINMENT SYSTEM

(75) Inventors: Yossef Tsuria, Shoham (IL); Amir Eilat, Tel Aviv (IL); David Zviel, Efrat (IL); Doron Handelman, Givataim (IL)

(73) Assignee: News Datacom Limited, West Drayton (GB)

( * ) Notice: Subject to any disclaimer, the term of this patent is extended or adjusted under 35 U.S.C. 154(b) by 0 days.

(21) Appl. No.: 09/445,207

(22) PCT Filed: Mar. 26, 1998

(86) PCT No.: PCT/IL98/00139

§ 371 (c)(1),
(2), (4) Date: Jul. 12, 2000

(87) PCT Pub. No.: WO98/47249

PCT Pub. Date: Oct. 22, 1998

(30) Foreign Application Priority Data

Apr. 16, 1997 (IL) ..................................... 120684

(51) Int. Cl.
*H04N 7/16* (2006.01)
*H04N 7/00* (2006.01)
*H04B 7/19* (2006.01)

(52) U.S. Cl. ............................ 725/75; 725/39; 725/45; 725/76; 725/77

(58) Field of Classification Search ............ 725/74–77, 725/6; 701/200–205
See application file for complete search history.

(56) References Cited

U.S. PATENT DOCUMENTS 3,997,718 A 12/1976 Ricketts et al. .............. 178/6.8
4,008,369 A 2/1977 Theurer et al. ................ 358/84
4,057,829 A 11/1977 Moorehead ................... 358/86

(Continued)

FOREIGN PATENT DOCUMENTS

EP 0 631 247 A2 12/1994

(Continued)

OTHER PUBLICATIONS

Matsuhita Avionics; MAS System 2000E entire publication, 1995.

(Continued)

*Primary Examiner*—Chris Kelley
*Assistant Examiner*—Reuben M. Brown
(74) *Attorney, Agent, or Firm*—Ladas and Parry LLP

(57) ABSTRACT

This invention discloses an entertainment system for providing entertainment to a user thereof, the system including an entertainment source for providing entertainment in a distributable form, entertainment distribution apparatus for distributing the entertainment and a plurality of entertainment delivery units, each entertainment delivery unit including receiving apparatus for receiving the entertainment from the entertainment source via the entertainment distribution apparatus, wherein at least one of the plurality of entertainment delivery units includes personalization apparatus adapted to receive a removable personalization element including personalization information, and the at least one of the plurality of entertainment units personalizes the entertainment based on the personalization information, and the personalization information includes at least one of the following: entertainment preference information; gaming information; and telecommunications information.

20 Claims, 19 Drawing Sheets

U.S. PATENT DOCUMENTS

| | | | | |
|---|---|---|---|---|
| 4,247,106 A | | 1/1981 | Jeffers et al. | 273/85 |
| 4,358,672 A | * | 11/1982 | Hyatt et al. | 235/380 |
| 4,428,078 A | | 1/1984 | Kuo | 455/3 |
| 4,513,315 A | | 4/1985 | Dekker et al. | 358/86 |
| 4,521,021 A | | 6/1985 | Dixon | 273/148 |
| 4,528,597 A | | 7/1985 | Klein et al. | 358/254 |
| 4,547,851 A | | 10/1985 | Kurland | |
| 4,554,579 A | | 11/1985 | Citta | 358/86 |
| 4,584,603 A | | 4/1986 | Harrison | 358/86 |
| 4,591,906 A | | 5/1986 | Morales-Garza et al. | 358/84 |
| 4,647,980 A | | 3/1987 | Steventon et al. | 358/254 |
| 4,682,370 A | | 7/1987 | Matthews | 455/166 |
| 4,835,604 A | | 5/1989 | Kondo et al. | 358/86 |
| 4,856,787 A | | 8/1989 | Itkis | 273/237 |
| 4,866,515 A | | 9/1989 | Tagawa et al. | 358/86 |
| 4,887,152 A | | 12/1989 | Matsuzaki et al. | 358/86 |
| 4,896,209 A | | 1/1990 | Matsuzaki et al. | 358/86 |
| 4,920,432 A | | 4/1990 | Eggers et al. | 360/33.1 |
| 4,930,158 A | | 5/1990 | Vogel | |
| 4,958,381 A | | 9/1990 | Toyoshima | 455/4 |
| 4,974,252 A | | 11/1990 | Osborne | 379/92 |
| 5,051,822 A | | 9/1991 | Rhoades | 358/86 |
| 5,179,517 A | | 1/1993 | Sarbin et al. | 364/410 |
| 5,213,337 A | | 5/1993 | Sherman | |
| 5,214,505 A | | 5/1993 | Rabowsky et al. | 358/86 |
| 5,220,419 A | | 6/1993 | Sklar et al. | 358/86 |
| 5,265,263 A | | 11/1993 | Ramsdale et al. | 455/33.2 |
| 5,289,272 A | | 2/1994 | Rabowsky et al. | 348/8 |
| 5,404,567 A | | 4/1995 | DePietro et al. | 455/6.3 |
| 5,429,361 A | | 7/1995 | Raven et al. | 273/138 |
| 5,430,791 A | | 7/1995 | Feit et al. | 379/67 |
| 5,465,082 A | | 11/1995 | Chaco | 340/825.54 |
| 5,476,259 A | | 12/1995 | Weingardt | 273/85 |
| 5,521,631 A | | 5/1996 | Budow et al. | 348/7 |
| 5,530,232 A | | 6/1996 | Taylor | 235/380 |
| 5,530,469 A | | 6/1996 | Garfinkle | 348/1 |
| 5,534,857 A | | 7/1996 | Laing et al. | 340/825.34 |
| 5,539,450 A | | 7/1996 | Handelman | 348/12 |
| 5,539,657 A | | 7/1996 | Utsumi et al. | 364/514 |
| 5,553,864 A | | 9/1996 | Sitrick | 463/31 |
| 5,559,313 A | | 9/1996 | Claus et al. | 253/380 |
| 5,566,327 A | | 10/1996 | Sehr | 395/600 |
| 5,574,968 A | * | 11/1996 | Olds et al. | 455/428 |
| 5,578,808 A | | 11/1996 | Taylor | 235/380 |
| 5,592,212 A | | 1/1997 | Handelman | 348/12 |
| 5,596,647 A | | 1/1997 | Wakai et al. | 381/77 |
| 5,610,822 A | * | 3/1997 | Murphy | 701/211 |
| 5,614,927 A | | 3/1997 | Gifford et al. | 395/612 |
| 5,617,331 A | * | 4/1997 | Wakai et al. | 725/76 |
| 5,640,192 A | | 6/1997 | Garfinkle | 348/1 |
| 5,649,118 A | | 7/1997 | Carlisle et al. | 395/241 |
| 5,651,050 A | | 7/1997 | Bhagat et al. | 455/431 |
| 5,655,961 A | | 8/1997 | Acres et al. | 463/27 |
| 5,661,517 A | | 8/1997 | Budow et al. | 348/13 |
| 5,666,291 A | | 9/1997 | Scott et al. | 395/200.8 |
| 5,801,751 A | * | 9/1998 | Sklar et al. | 725/76 |
| 5,812,932 A | | 9/1998 | Wiedeman et al. | 455/13.1 |
| 5,815,809 A | | 9/1998 | Ward et al. | 455/428 |
| 5,966,442 A | * | 10/1999 | Sachdev | 380/212 |
| 6,527,638 B1 | * | 3/2003 | Walker et al. | 463/25 |

FOREIGN PATENT DOCUMENTS

| | | |
|---|---|---|
| EP | 0 631 247 A3 | 12/1994 |
| IL | 80871/2 | 5/1994 |
| WO | 94/18763 | 8/1994 |
| WO | WO 94/18763 | 8/1994 |
| WO | WO 97/44749 | 11/1997 |
| WO | WO 97/44761 | 11/1997 |
| WO | PCT/IL98/00139 | 11/1998 |

OTHER PUBLICATIONS

Hughes Avicon, Direct Broadcast Satellite TV for Airborne Applications, entire publication, 1996.

Hughes-Avicon, Press Release, entire publication, 1996.

SONY, The Next Generation In Personal Passenger Entertainment, entire publication, 1996.

"Direct Broadcast Satellite TV for Airborne Applications," Hughes-Avicom International, 1996.

"Making Digital Entertainment Fly," Mitsubishi Electric, 1196.

Rosato, D., "The Internet on Flights May Fly," USA Today, Dec. 13, 1995.

Zoreda, J. & J.M. Oton, "Smart Cards," Artech House, 1994, pp. 139-164.

Radding, A., "Casino Takes a Gamble on Cashless Transactions," Infoworld Magazine, Jun. 20, 1994, p. 70.

Seanell, E., "IBM Plays its Mobile Card," Infoworld Magazine, Jul. 1, 1996, pp. 1; 26.

Selwitz, R., "High Tech Enters the 21st Century," Hotel & Motel Management, Nov. 4, 1991, pp. B1; B4-B5.

"Gambling May Yield Revenue Windfall," Aviation Week & Space Technology, Aug. 15, 1994.

"In Seat Video a Headache," Aviation Week & Space Technology, Aug. 15, 1994.

Hendry, M., "Smart Card Security and Applications," Artech House pp. 195-204.

Reddy, P. and V. Akella, "Design of an Adaptive Smart Card With In-Lab Experiments", Institute of Transportation Studies, California.

Komanecky, M. and D. Claus, "IVHS Applications of Smart Cards," Vehicle Navigation & Information Systems Conference Proceedings, 1991, pp. 977-987.

Chaum, "IC Cards in Videotex Systems," Smart Card 2000: The Future of IC Cards, pp. 179-186.

BYTE Magazine (1996) p. 223 "What's New Hardware".

Sanyo Electric News Release Announcing Super-Light-Weight Pen-Based PC (1995).

Sanyo Electric News Release Announcing Notebook PC with Pentium™ CPU (1995) with Partial English Translation.

Egozi, A. "Gambling on High" Yedioth Aharonot (Israel Daily Newspaper) (1996) With Complete English Translation.

The Mouse Power Buzz: In-Flight Multimedia TAK Website "World First: Cathay Pacific's In-Flight Multimedia Takes to the Air" (1996).

Promotional Release "Hughes-Avicom Takes Television Airborne-Featuring Live Satellite Broadcast on Board Delta Air Lines' Spirit of Delta B767 Aircraft" (1996).

* cited by examiner

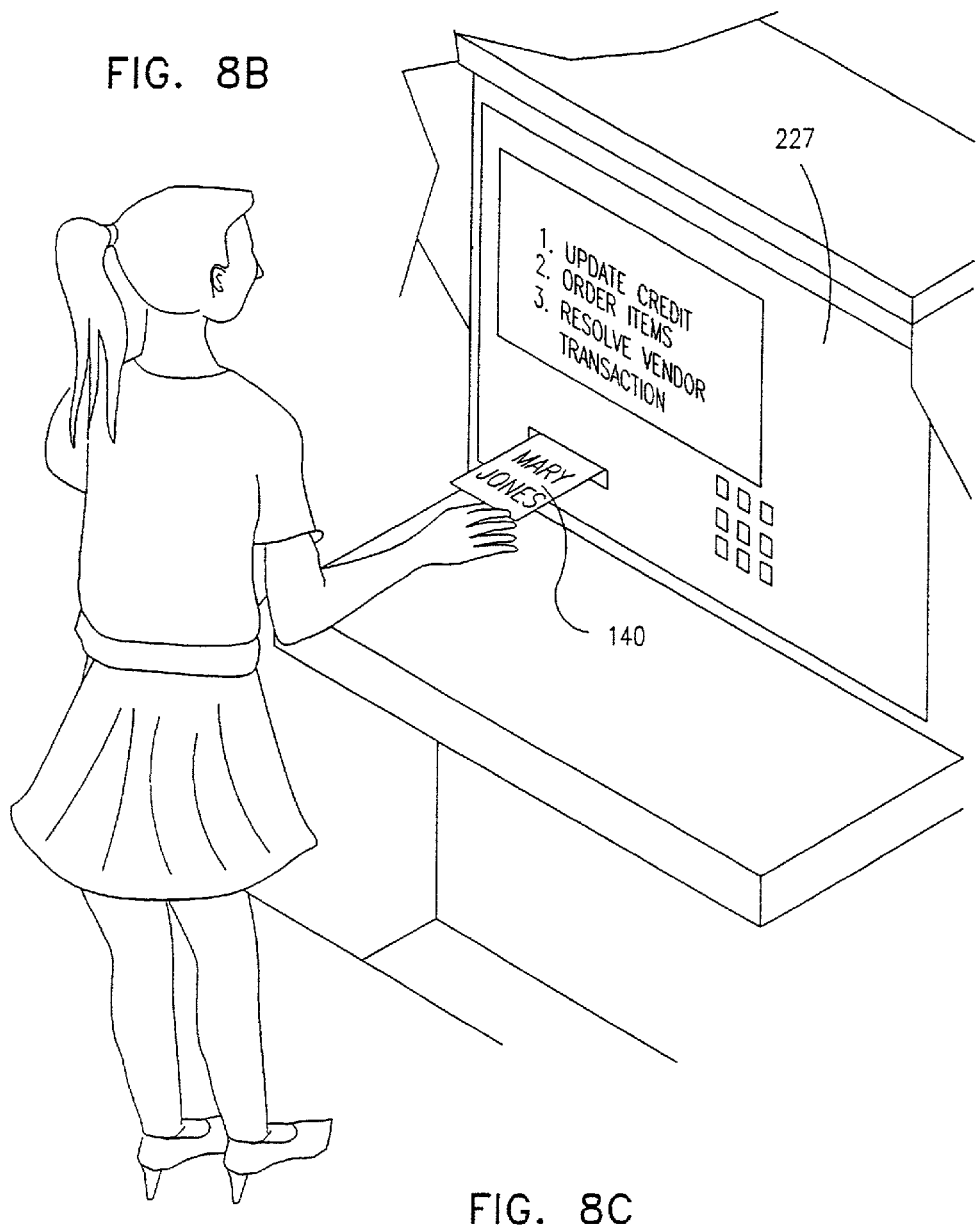

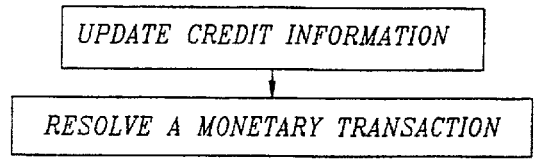
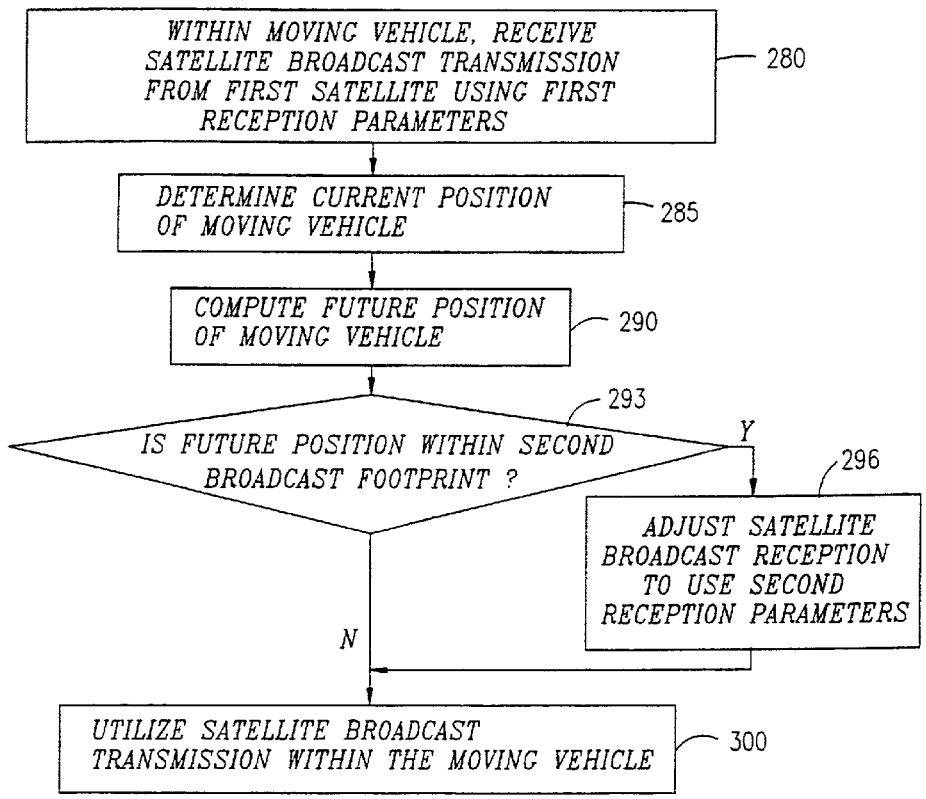
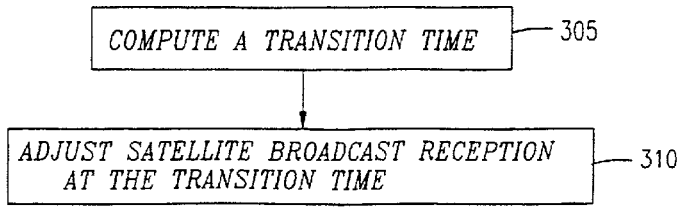

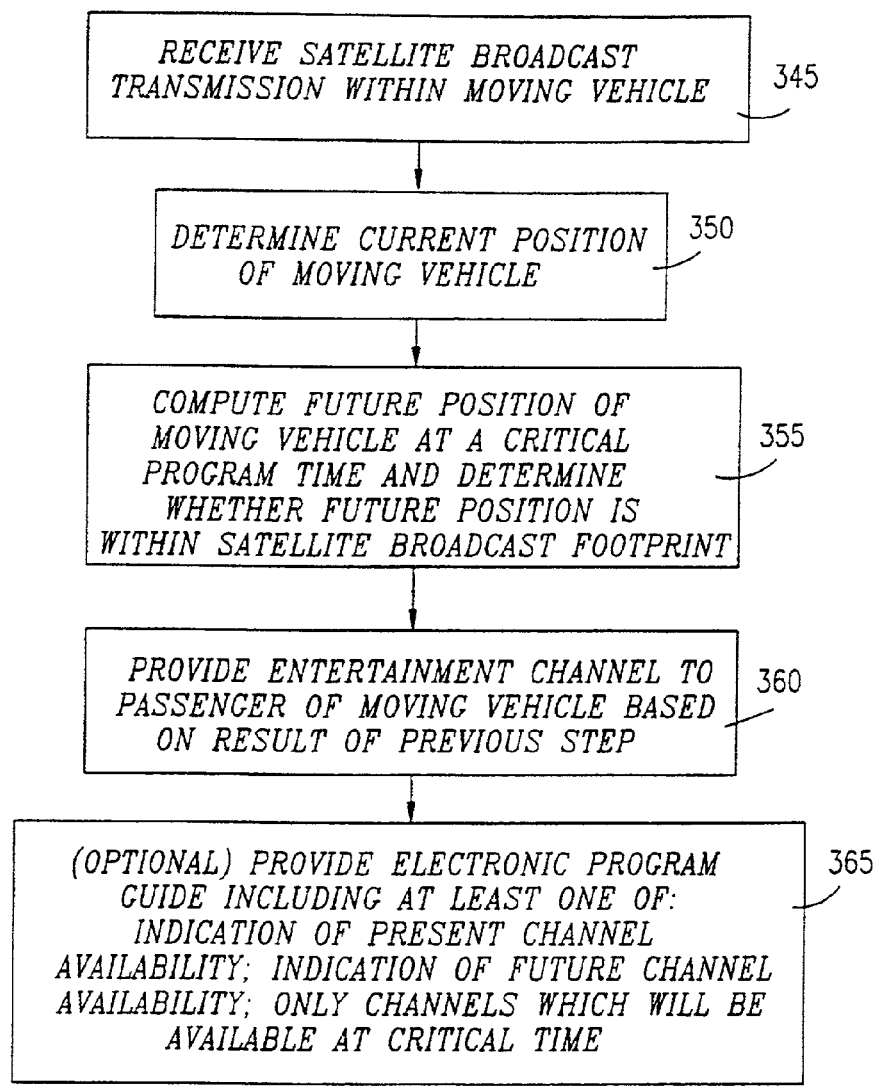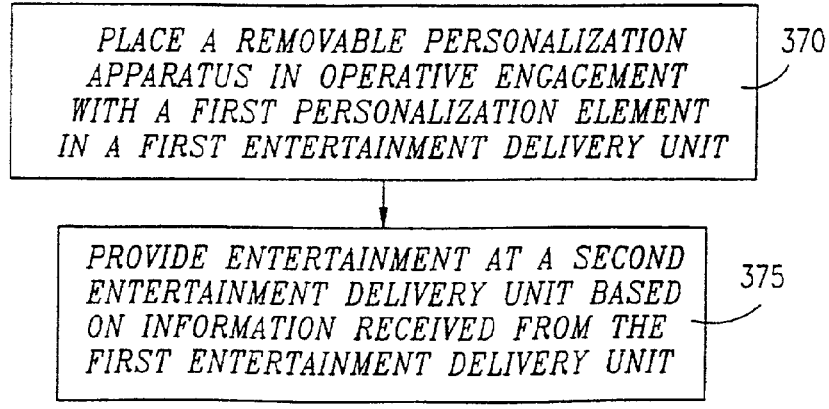

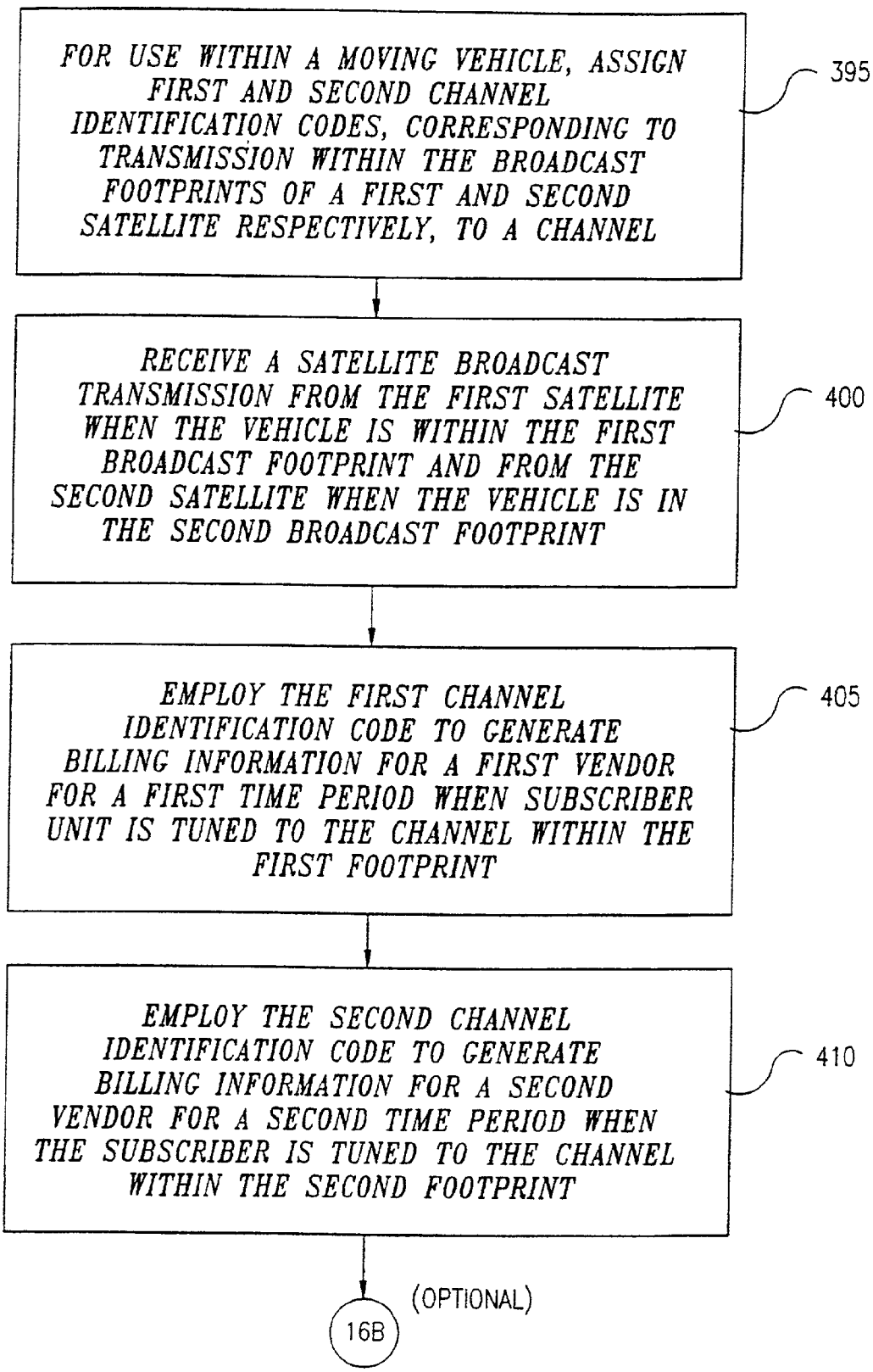

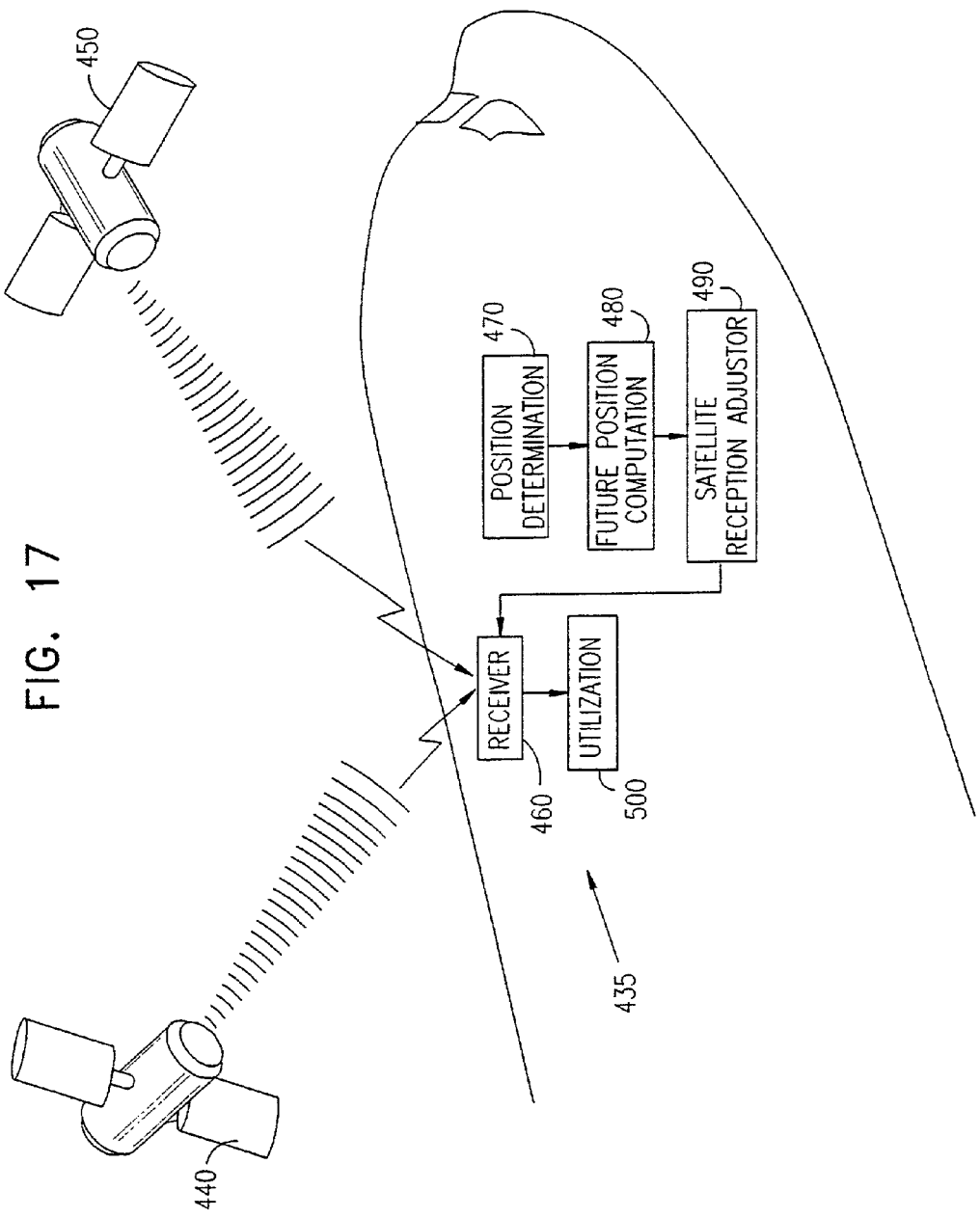

ENTERTAINMENT SYSTEM

FIELD OF THE INVENTION

The present invention relates to entertainment systems in general, and in particular to multi-user entertainment systems for use within an enclosed area such as a building or a vehicle, particularly an airplane.

BACKGROUND OF THE INVENTION

Multi-user entertainment systems, particularly those intended for use within an enclosed area such as a building or a vehicle, particularly an airplane, are well-known in the art. Such entertainment systems and components useful therein are described, for example, in the following US patents:

U.S. Pat. No. 4,835,604 to Kondo et al.;
U.S. Pat. No. 4,896,209 to Matsuzaki et al.;
U.S. Pat. No. 4,887,152 to Matsuzaki et al.;
U.S. Pat. No. 4,866,515 to Tagawa et al.;
U.S. Pat. No. 4,584,603 to Harrison;
U.S. Pat. No. 5,539,657 to Utsumi et al.;
U.S. Pat. No. 4,428,078 to Kuo;
U.S. Pat. No. 5,289,272 to Rabowsky et al.;
U.S. Pat. No. 5,220,419 to Sklar et al.;
U.S. Pat. No. 5,214,505 to Rabowsky et al.;
U.S. Pat. No. 4,958,381 to Toyoshima;
U.S. Pat. No. 4,521,021 to Dixon;
U.S. Pat. No. 4,647,980 to Steventon et al.;
U.S. Pat. No. 4,008,369 to Theurer et al.;
U.S. Pat. No. 4,920,432 to Eggers et al.;
U.S. Pat. No. 5,051,822 to Rhoades;
U.S. Pat. No. 4,247,106 to Jeffers et al.;
U.S. Pat. No. 3,997,718 to Ricketts et al.;
U.S. Pat. No. 4,057,829 to Moorehead;
U.S. Pat. No. 4,591,906 to Morales-Garza et al.;
U.S. Pat. No. 4,554,579 to Citta;
U.S. Pat. No. 4,513,315, to Dekker et al.

A direct broadcast TV satellite system for use in aircraft is described in "Direct Broadcast Satellite TV For Airborne Applications", by Hughes-Avicom International, Inc., copyright 1996.

An in-flight entertainment system called Mitsubishi TD 120 is described in a brochure by Mitsubishi Electronics America, Inc., entitled "Making Digital Entertainment Fly", copyright 1996.

Non-program uses of subscriber television are described in U.S. Pat. Nos. 5,539,450 and 5,592,212 to Handelman.

The disclosures of all references mentioned above and throughout the present specification are hereby incorporated herein by reference.

SUMMARY OF THE INVENTION

The present invention seeks to provide an improved entertainment system.

There is thus provided in accordance with a preferred embodiment of the present invention an entertainment system for providing entertainment to a user thereof, the system including an entertainment source for providing entertainment in a distributable form, entertainment distribution apparatus for distributing the entertainment, and a plurality of entertainment delivery units, each entertainment delivery unit including receiving apparatus for receiving the entertainment from the entertainment source via the entertainment distribution apparatus, wherein at least one of the plurality of entertainment delivery units includes personalization apparatus adapted to receive a removable personalization element including personalization information, and the at least one of the plurality of entertainment units personalizes the entertainment based on the personalization information, and the personalization information includes at least one of the following: entertainment preference information, gaming information, and telecommunications information.

Further in accordance with a preferred embodiment of the present invention the system also includes a telecommunications switch, and the telecommunications information includes user identification information, and the telecommunications switch routes telecommunications intended for the user to the entertainment delivery unit via the entertainment distribution apparatus based on the user identification information.

There is also provided in accordance with another preferred embodiment of the present invention an entertainment delivery unit for use with an entertainment system in providing entertainment to a user thereof, the system including an entertainment source for providing entertainment in a distributable form and entertainment distribution apparatus for distributing the entertainment, the entertainment delivery unit including receiving apparatus for receiving the entertainment from the entertainment source via the entertainment distribution apparatus, and personalization apparatus adapted to receive a removable personalization element including personalization information, wherein the entertainment delivery unit personalizes the entertainment based on the personalization information, and the personalization information includes at least one of the following entertainment preference information, gaming information, and telecommunications information.

Further in accordance with a preferred embodiment of the present invention the entertainment preference information includes entertainment program preference information, and the personalization apparatus personalizes an entertainment program schedule based on the entertainment program preference information.

Still further in accordance with a preferred embodiment of the present invention the entertainment preference information includes entertainment program preference information, and the personalization apparatus makes at least one program from among a plurality of programs received from the entertainment source available to the user based, at least in part, on the entertainment program preference information.

Additionally in accordance with a preferred embodiment of the present invention the gaming information includes game preference information, and the entertainment delivery unit provides gaming to the user based, at least in part, on the gaming information.

Moreover in accordance with a preferred embodiment of the present invention the gaming information includes betting limit information, and the entertainment delivery unit limits betting by the user based, at least in part, on the gaming information.

Further in accordance with a preferred embodiment of the present invention the entertainment delivery unit is located within an enclosed area operative to hold a plurality of users.

Still further in accordance with a preferred embodiment of the present invention the enclosed area includes a vehicle.

Additionally in accordance with a preferred embodiment of the present invention the vehicle includes an airplane.

Moreover in accordance with a preferred embodiment of the present invention the enclosed area includes a building.

Further in accordance with a preferred embodiment of the present invention the enclosed area includes a plurality of entertainment delivery units including at least a first entertainment delivery unit and a second entertainment delivery unit, and the first entertainment delivery unit is operative, when in operative association with a removable personalization element including an indication of association between a first user of the first entertainment delivery unit and a second user of the second entertainment delivery unit, to indicate to the first user that the second user is present within the enclosed area.

Still further in accordance with a preferred embodiment of the present invention the removable personalization element includes a smart card.

Additionally in accordance with a preferred embodiment of the present invention the removable personalization apparatus chooses at least one advertisement from a plurality of available advertisements for display to the user based, at least in part, on the entertainment preference information.

There is also provided in accordance with another preferred embodiment of the present invention a method for providing access to entertainment services including providing a removable personalization element, loading personalization information into the removable personalization element, the personalization information including at least one of the following entertainment preference information, gaming information, and telecommunications information, and placing the removable personalization element into removable operative engagement with an entertainment delivery unit, the entertainment delivery unit being adapted for use with an entertainment system in providing entertainment to a user thereof, the system including an entertainment source for providing entertainment in a distributable form and entertainment distribution apparatus for distributing the entertainment.

Further in accordance with a preferred embodiment of the present invention the entertainment delivery unit is located within an enclosed area operative to hold a plurality of users.

Still further in accordance with a preferred embodiment of the present invention the enclosed area includes a vehicle.

Additionally in accordance with a preferred embodiment of the present invention the vehicle includes an airplane.

Moreover in accordance with a preferred embodiment of the present invention the enclosed area includes a building.

Further in accordance with a preferred embodiment of the present invention the method also includes placing the removable personalization element in removable operative contact with an interactive terminal, and varying the behavior of the interactive terminal based, at least in part, on the personalization information.

Still further in accordance with a preferred embodiment of the present invention the interactive terminal includes a terminal for ordering items.

Additionally in accordance with a preferred embodiment of the present invention the personalization information includes credit information, and the step of varying the behavior includes updating the credit information.

Moreover in accordance with a preferred embodiment of the present invention the interactive terminal includes a payment resolution terminal, and the behavior of the payment resolution terminal includes mediating the resolution of a monetary transaction with at least one vendor with regard to transactions made using the removable personalization element.

Further in accordance with a preferred embodiment of the present invention the at least one vendor includes a plurality of vendors.

There is also provided in accordance with another preferred embodiment of the present invention a method for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the method including receiving the satellite broadcast transmission from the first satellite using the first reception parameters, determining a current position of the moving vehicle, computing a future position of the moving vehicle, if the future position of the moving vehicle is within the second broadcast footprint, adjusting satellite broadcast reception to use the second reception parameters thereby to receive the satellite broadcast transmission from the second satellite, and utilizing the satellite broadcast transmission within the moving vehicle.

Further in accordance with a preferred embodiment of the present invention the satellite broadcast includes a television broadcast.

Still further in accordance with a preferred embodiment of the present invention the satellite broadcast includes a data broadcast.

Additionally in accordance with a preferred embodiment of the present invention the step of computing a future position of the moving vehicle includes computing a transition time at which the moving vehicle will be within a predetermined distance of the common border, and the step of adjusting satellite broadcast reception includes adjusting satellite broadcast reception at the transition time.

There is also provided in accordance with another preferred embodiment of the present invention a method for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the method including receiving, as a primary signal, the satellite broadcast transmission from the first satellite using the first reception parameters, receiving, as a secondary signal, the satellite broadcast transmission from the second satellite using the second reception parameters, comparing a measure of quality of the primary signal to a measure of quality of the secondary signal, if the measure of quality of the secondary signal is higher than the measure of quality of the primary signal, receiving, as a primary signal, the satellite broadcast transmission from the second satellite using the second reception parameters, and utilizing the primary signal within the moving vehicle.

Further in accordance with a preferred embodiment of the present invention the if-receiving step also includes receiving, as a secondary signal, the satellite broadcast transmission from the first satellite using the first reception parameters.

There is also provided in accordance with another preferred embodiment of the present invention a method for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the method including adjusting reception parameters to receive the satellite broadcast transmission from the first satellite using the first reception parameters, upon receiving, from a station external to the moving vehicle, a signal indicating that the moving vehicle is moving from the first broadcast footprint to the second broadcast footprint, adjusting the reception parameters to receive the satellite broadcast transmission from the second satellite using the second reception parameters, and utilizing the satellite broadcast transmission within the moving vehicle.

Further in accordance with a preferred embodiment of the present invention the moving vehicle includes an airplane.

Still further in accordance with a preferred embodiment of the present invention the satellite broadcast transmission includes at least one entertainment channel, and the step of utilizing includes providing the at least one entertainment channel to at least one passenger in the moving vehicle.

Additionally in accordance with a preferred embodiment of the present invention the step of providing at least one entertainment channel includes providing the at least one entertainment channel to the at least one passenger when the moving vehicle is located within the first broadcast footprint and when the moving vehicle is located within the second broadcast footprint without intervention by the at least one passenger.

There is also provided in accordance with another preferred embodiment of the present invention a method for receiving a satellite broadcast transmission within a moving vehicle, the vehicle moving from within a broadcast footprint of a first satellite to a region outside the broadcast footprint, the satellite broadcast transmission being transmitted from the first satellite and including at least one entertainment channel having an associated critical program time, the method including adjusting reception parameters to receive the satellite broadcast transmission from the first satellite using the first reception parameters, determining a current position of the moving vehicle, computing a future position of the moving vehicle at the critical program time and determining whether the future position lies within the broadcast footprint, thus producing a result, and providing the at least one entertainment channel to at least one passenger in the moving vehicle based, at least in part, on the result of the computing-determining step.

Further in accordance with a preferred embodiment of the present invention the step of providing includes allowing the passenger to receive the entertainment channel only if the result of the computing-determining step indicates that the future position lies within the broadcast footprint.

Still further in accordance with a preferred embodiment of the present invention the step of providing includes if the result of the computing-determining step indicates that the future position lies outside the broadcast footprint, cautioning the passenger regarding availability of the entertainment channel at the critical program time.

Additionally in accordance with a preferred embodiment of the present invention the providing step includes providing an electronic program guide including a plurality of entertainment channel offerings.

Moreover in accordance with a preferred embodiment of the present invention the plurality of entertainment channel offerings includes the entertainment channel only if the result of the computing-determining step indicates that the future position lies within the broadcast footprint.

Further in accordance with a preferred embodiment of the present invention the plurality of entertainment channel offerings includes the entertainment channel, and the electronic program guide includes an indication that the entertainment channel will become unavailable only if the result of the computing-determining step indicates that the future position lies outside the broadcast footprint.

Still further in accordance with a preferred embodiment of the present invention the electronic program guide includes, for each one of the plurality of entertainment channel offerings, an indication of whether the one of the plurality of entertainment channel offerings is currently available.

There is also provided in accordance with another preferred embodiment of the present invention, for use in a vehicle operative to carry a first plurality of passengers and including a second plurality of entertainment delivery units for use with an entertainment system in providing entertainment to the first plurality of passengers, the system including an entertainment source for providing entertainment in a distributable form and entertainment distribution apparatus for distributing the entertainment, the second plurality of entertainment delivery unit including receiving apparatus for receiving the entertainment from the entertainment source via the entertainment distribution apparatus and personalization apparatus adapted to receive a removable personalization element including personalization information, a method for controlling viewing of entertainment including placing a removable personalization apparatus in operative engagement with a first personalization element in a first entertainment delivery unit included in the second plurality of entertainment delivery units, and providing entertainment at a second entertainment delivery unit included in the second plurality of entertainment delivery units based, at least in part, on information received from the first entertainment delivery unit.

Further in accordance with a preferred embodiment of the present invention the method also includes placing a second removable personalization apparatus in operative engagement with a second personalization element in the second entertainment delivery unit.

Still further in accordance with a preferred embodiment of the present invention first removable personalization apparatus includes personalization information, and the information received includes the personalization information.

Additionally in accordance with a preferred embodiment of the present invention the personalization information includes credit information.

Moreover in accordance with a preferred embodiment of the present invention the information received includes information provided by a passenger using the first entertainment delivery unit.

Further in accordance with a preferred embodiment of the present invention the information provided by the passenger includes parental control information.

Still further in accordance with a preferred embodiment of the present invention the information provided by the passenger includes spending approval information.

There is also provided in accordance with another preferred embodiment of the present invention a method for providing pay-per-view billing of a subscriber of a satellite broadcast transmission within a moving vehicle moving from a first broadcast footprint of a first satellite to within a second broadcast footprint of a second satellite, the first broadcast footprint and the second broadcast footprint having a common border, the method including assigning first and second program identification codes to a program within the satellite broadcast transmission, wherein the first program identification code is associated with the program transmitted within the first broadcast footprint of the first satellite, and the second program identification code is associated with program transmitted within the second broadcast footprint of the second satellite, employing the first program identification code to generate first billing information to credit a first vendor for a first time period during which the subscriber views the program transmitted within the first broadcast footprint of the first satellite, and employing the second program identification code to generate second billing information to credit a second vendor for a second time period during which the subscriber views the program transmitted within the second broadcast footprint of the second satellite.

There is also provided in accordance with another preferred embodiment of the present invention a billing method for providing pay-per-view billing of a subscriber of a satellite broadcast transmission within a moving vehicle moving from a first broadcast footprint of a first satellite to within a second broadcast footprint of a second satellite, the first broadcast footprint and the second broadcast footprint having a common border, the method including assigning first and second channel identification codes to a channel within the satellite broadcast transmission, wherein the first channel identification code is associated with the channel transmitted within the first broadcast footprint of the first satellite, and the second channel identification code is associated with the channel transmitted within the second broadcast footprint of the second satellite, receiving the satellite broadcast transmission at a subscriber unit from the first satellite when the vehicle is within the first broadcast footprint of the first satellite, and from the second satellite when the vehicle is within the second broadcast footprint of the second satellite, employing the first channel identification code to generate first billing information to credit a first vendor for a first time period during which the subscriber unit is tuned to the channel transmitted within the first broadcast footprint of the first satellite, and employing the second channel identification code to generate second billing information to credit a second vendor for a second time period during which the subscriber unit is tuned to the channel transmitted within the second broadcast footprint of the second satellite.

Further in accordance with a preferred embodiment of the present invention the method also includes determining that the moving vehicle is at the common border, obtaining a first measure of quality of the satellite broadcast transmission from the first satellite, and a second measure of quality of the satellite broadcast transmission from the second satellite, comparing the first measure of quality with the second measure of quality, and employing the first channel identification code to generate third billing information to credit the first vendor for a third time period during which the vehicle is within the common border, the subscriber unit is tuned to the channel within the satellite broadcast transmission, and the first measure of quality is higher than the second measure of quality, and employing the second channel identification code to generate fourth billing information to credit the second vendor for a fourth time period during which the vehicle is within the common border, the subscriber unit is tuned to the channel within the satellite broadcast transmission, and the second measure of quality is not lower than the first measure of quality.

There is also provided in accordance with another preferred embodiment of the present invention a method for providing entertainment including providing entertainment in a distributable form, distributing the entertainment, receiving the entertainment from the entertainment source via the entertainment distribution apparatus, and personalizing the entertainment based on personalization information included in a removable personalization element, wherein the personalization information includes at least one of the following entertainment preference information, gaming information, and telecommunications information.

There is also provided in accordance with another preferred embodiment of the present invention apparatus for providing access to entertainment services including a removable personalization element, and loading apparatus for loading personalization information into the removable personalization element, the personalization information including at least one of the following entertainment preference information, gaming information, and telecommunications information, wherein removable personalization element is operative to be placed into removable operative engagement with an entertainment delivery unit, the entertainment delivery unit being adapted for use with an entertainment system in providing entertainment to a user thereof, the system including an entertainment source for providing entertainment in a distributable form and entertainment distribution apparatus for distributing the entertainment.

There is also provided in accordance with another preferred embodiment of the present invention apparatus for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the apparatus including a receiver for receiving the satellite broadcast transmission from the first satellite using the first reception parameters, position determination apparatus for determining a current position of the moving vehicle, future position computation apparatus for computing a future position of the moving vehicle, a satellite reception adjustor operative, if the future position of the moving vehicle is within the second broadcast footprint, to adjust satellite broadcast reception to use the second reception parameters thereby to receive the satellite broadcast transmission from the second satellite, and utilization apparatus for utilizing the satellite broadcast transmission within the moving vehicle.

There is also provided in accordance with another preferred embodiment of the present invention apparatus for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the apparatus including a first receiver for receiving, as a primary signal, the satellite broadcast transmission from the first satellite using the first reception parameters, a second receiver for receiving, as a secondary signal, the satellite broadcast transmission from the second satellite using the second reception parameters, a comparator for comparing a measure of quality of the primary signal to a measure of quality of the secondary signal, a reception adjustor operative, if the measure of quality of the secondary signal is higher than the measure of quality of the primary signal, to cause the first receiver to receive, as a primary signal, the satellite broadcast transmission from the second satellite using the second reception parameters, and utilization apparatus for utilizing the primary signal within the moving vehicle.

There is also provided in accordance with another preferred embodiment of the present invention apparatus for receiving a satellite broadcast transmission within a moving vehicle, the vehicle moving from within a first broadcast footprint of a first satellite to within a second broadcast footprint of a second satellite, the first broadcast footprint and the second broadcast footprint having a common border, the satellite broadcast transmission being transmitted from the first satellite with first reception parameters and from the second satellite with second reception parameters, the apparatus including a reception adjustor for adjusting reception parameters to receive the satellite broadcast transmission from the first satellite using the first reception parameters and operative, upon receiving from a station external to the moving vehicle, a signal indicating that the moving vehicle is moving from the first broadcast footprint to the second broadcast footprint, to adjust the reception parameters to receive the satellite broadcast transmission from the second satellite using the second reception parameters, and utilization apparatus for utilizing the satellite broadcast transmission within the moving vehicle.

There is also provided in accordance with another preferred embodiment of the present invention apparatus for receiving a satellite broadcast transmission within a moving vehicle, the vehicle moving from within a broadcast footprint of a first satellite to a region outside the broadcast footprint, the satellite broadcast transmission being transmitted from the first satellite and including at least one entertainment channel having an associated critical program time, the apparatus including a reception adjustor for adjusting reception parameters to receive the satellite broadcast transmission from the first satellite using the first reception parameters, position determination apparatus for determining a current position of the moving vehicle, future position computation apparatus for computing a future position of the moving vehicle at the critical program time and determining whether the future position lies within the broadcast footprint, thus producing a result, and entertainment apparatus for providing the at least one entertainment channel to at least one passenger in the moving vehicle based, at least in part, on an output of the future position computation apparatus.

There is also provided in accordance with another preferred embodiment of the present invention, for use in a vehicle operative to carry a first plurality of passengers and including a second plurality of entertainment delivery units for use with an entertainment system in providing entertainment to the first plurality of passengers, the system including an entertainment source for providing entertainment in a distributable form and entertainment distribution apparatus for distributing the entertainment, the second plurality of entertainment delivery unit including receiving apparatus for receiving the entertainment from the entertainment source via the entertainment distribution apparatus and personalization apparatus adapted to receive a removable personalization element including personalization information, apparatus for controlling viewing of entertainment including a removable personalization apparatus operative to be placed in operative engagement with a first personalization element in a first entertainment delivery unit included in the second plurality of entertainment delivery units, and entertainment apparatus for providing entertainment at a second entertainment delivery unit included in the second plurality of entertainment delivery units based, at least in part, on information received from the first entertainment delivery unit.

There is also provided in accordance with another preferred embodiment of the present invention apparatus for providing pay-per-view billing of a subscriber of a satellite broadcast transmission within a moving vehicle moving from a first broadcast footprint of a first satellite to within a second broadcast footprint of a second satellite, the first broadcast footprint and the second broadcast footprint having a common border, the apparatus including code assignment apparatus for assigning first and second program identification codes to a program within the satellite broadcast transmission, wherein the first program identification code is associated with the program transmitted within the first broadcast footprint of the first satellite, and the second program identification code is associated with program transmitted within the second broadcast footprint of the second satellite, a billing information generator for employing the first program identification code to generate first billing information to credit a first vendor for a first time period during which the subscriber views the program transmitted within the first broadcast footprint of the first satellite and for employing the second program identification code to generate second billing information to credit a second vendor for a second time period during which the subscriber views the program transmitted within the second broadcast footprint of the second satellite.

There is also provided in accordance with another preferred embodiment of the present invention billing apparatus for providing pay-per-view billing of a subscriber of a satellite broadcast transmission within a moving vehicle moving from a first broadcast footprint of a first satellite to within a second broadcast footprint of a second satellite, the first broadcast footprint and the second broadcast footprint having a common border, the apparatus including code assignment apparatus for assigning first and second channel identification codes to a channel within the satellite broadcast transmission, wherein the first channel identification code is associated with the channel transmitted within the first broadcast footprint of the first satellite, and the second channel identification code is associated with the channel transmitted within the second broadcast footprint of the second satellite, a subscriber unit for receiving the satellite broadcast transmission from the first satellite when the vehicle is within the first broadcast footprint of the first satellite, and from the second satellite when the vehicle is within the second broadcast footprint of the second satellite, a billing information generator for employing the first channel identification code to generate first billing information to credit a first vendor for a first time period during which the subscriber unit is tuned to the channel transmitted within the first broadcast footprint of the first satellite and for employing the second channel identification code to generate second billing information to credit a second vendor for a second time period during which the subscriber unit is tuned to the channel transmitted within the second broadcast footprint of the second satellite.

BRIEF DESCRIPTION OF THE DRAWINGS

The present invention will be understood and appreciated more fully from the following detailed description, taken in conjunction with the drawings in which:

FIG. 8B is a simplified pictorial illustration of a system comprising an interactive terminal accepting a removable personalization element, the system constructed and operative in accordance with a preferred embodiment of the present invention;

FIGS. 8C and 9 are simplified flowchart illustrations of a preferred method of operation of the apparatus of FIG. 8B;

FIG. 10A is a simplified flowchart illustration of a preferred method of receiving a satellite broadcast transmission within a moving vehicle, useful in conjunction with the system of FIG. 1;

FIG. 10B is a simplified flowchart illustration of a preferred method of operation of steps 290 and 296 of FIG. 10A;

FIG. 13 is a simplified flowchart illustration of a method of providing entertainment to a passenger of a moving vehicle, useful in conjunction with the system of FIG. 1;

FIG. 14 is a simplified flowchart illustration of an alternative method of providing entertainment to a user of the system of FIG. 1;

FIGS. 16A and 16B, taken together, comprise a simplified flowchart illustration of an alternative method for providing billing of a subscriber of a satellite broadcast transmission within a moving vehicle, useful in conjunction with the system of FIG. 1;

FIG. 17 is a simplified partly pictorial, partly block diagram illustration of a preferred embodiment of apparatus for carrying out the method of FIG. 10A, constructed and operative in accordance with an alternative preferred embodiment of the present invention;

DETAILED DESCRIPTION OF A PREFERRED EMBODIMENT

Figure 1:
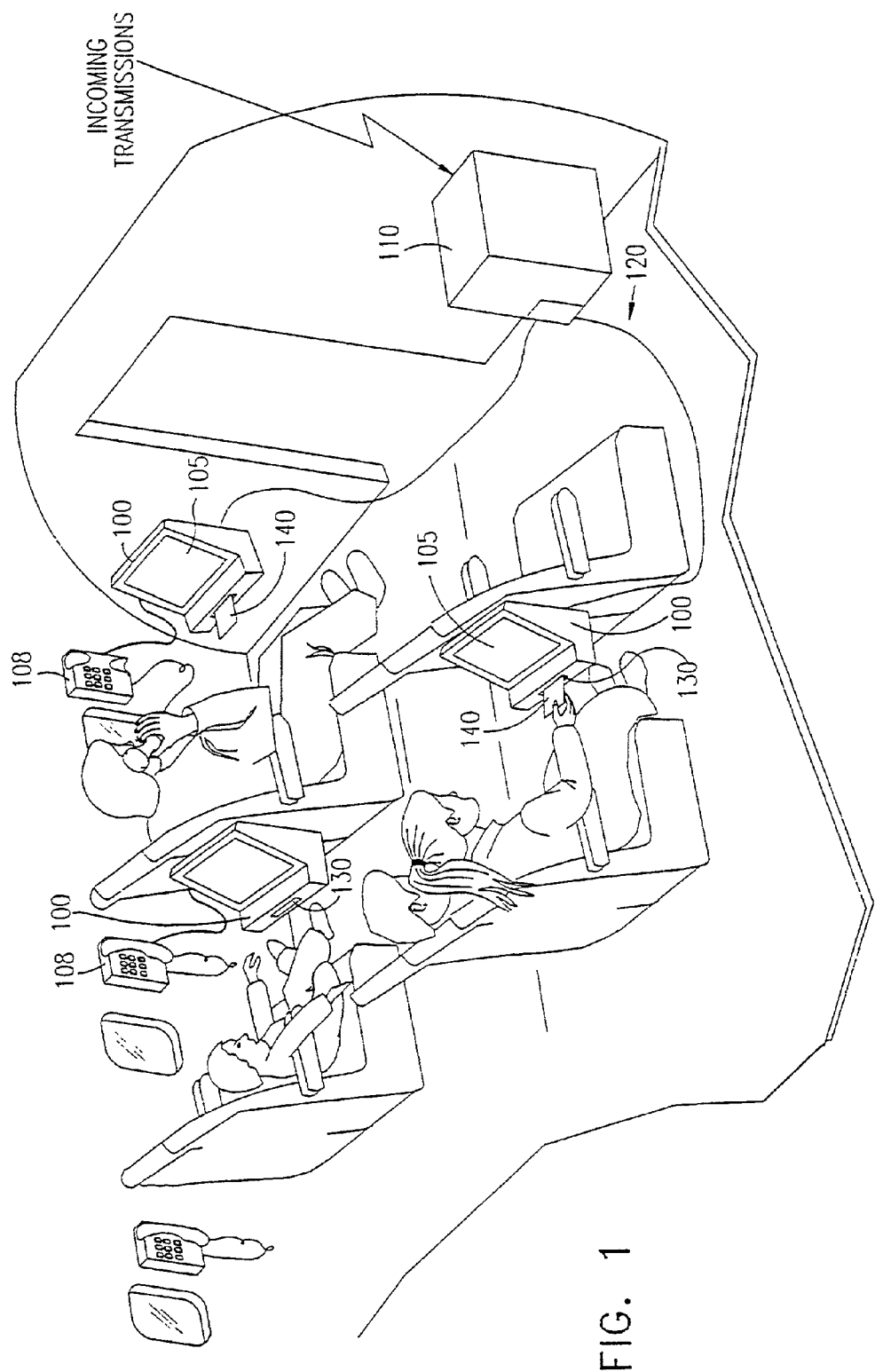
FIG. 1 is a simplified pictorial illustration of an entertainment system constructed and operative in accordance with a preferred embodiment of the present invention.
Figure 2:
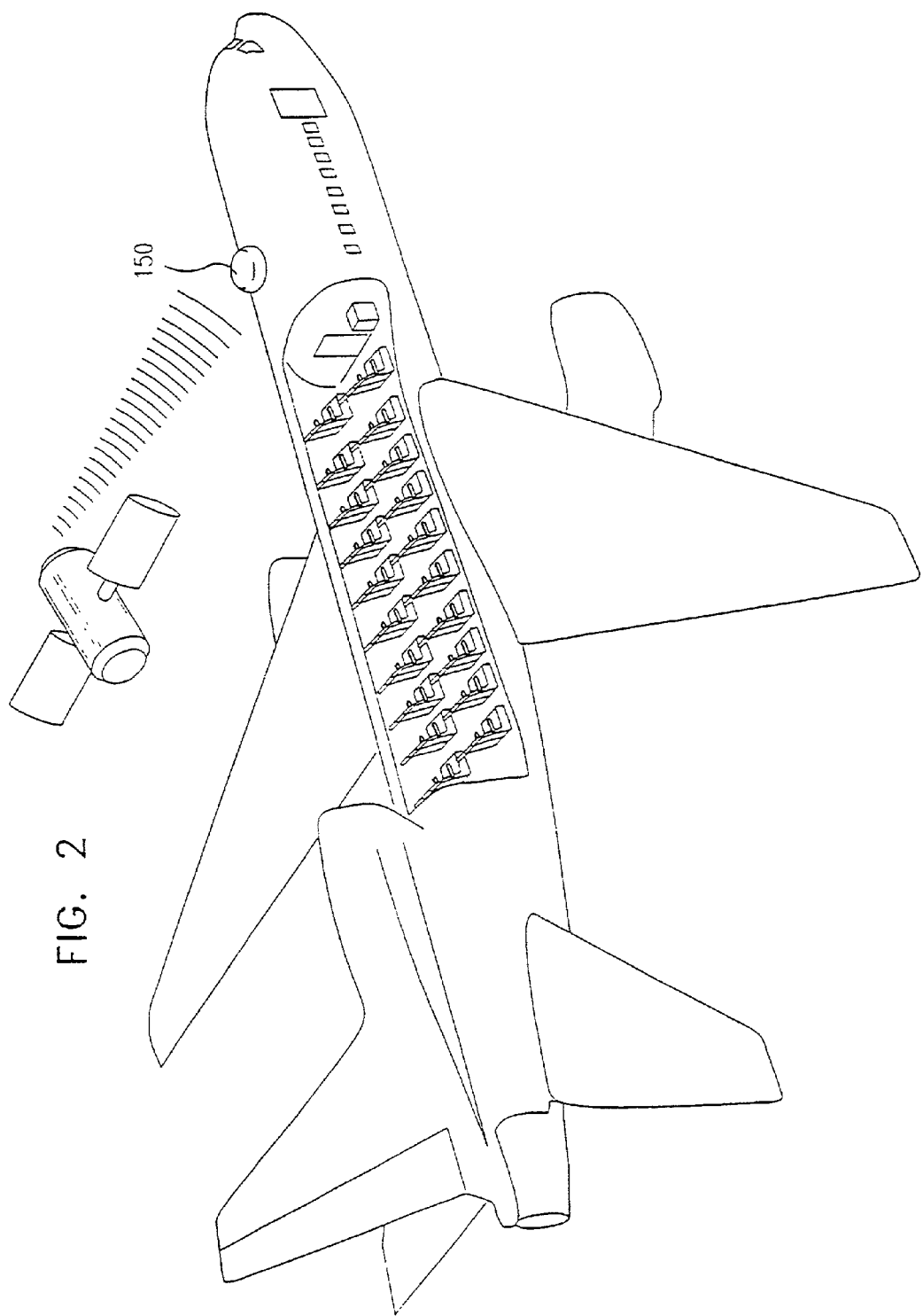
FIG. 2 is a simplified pictorial illustration of an airplane comprising the system of FIG. 1.

Reference is now made to FIG. 1 which is a simplified pictorial illustration of an entertainment system constructed and operative in accordance with a preferred embodiment of the present invention. The system of FIG. 1 is shown situated within an airplane. Reference is hereby additionally made to FIG. 2, which is a simplified pictorial illustration of an airplane comprising the system of FIG. 1.

It is appreciated that the system of FIG. 1 may or may not be situated within any appropriate enclosed area, particularly within a building or a vehicle such as an airplane, a ship, a bus, or any other appropriate vehicle. It is also appreciated that the system of FIG. 1 may be especially useful when situated within a moving vehicle such as an airplane.

The system of FIG. 1 comprises a plurality of entertainment delivery units 100. Each entertainment delivery unit 100 may be any suitable entertainment delivery unit capable of providing entertainment to a user thereof. It is appreciated that, in addition to the plurality of entertainment delivery units 100, other, conventional entertainment units, such as individualized movie viewing screens, may also be used.

The term "entertainment", as used throughout the present specification and claims, refers to any form of entertainment which may be provided by an electronic device or similar device, such as, for example: audio entertainment; video entertainment; audio-video entertainment; computerized games; gambling games; games incorporating video and/or audio elements; and any combination of the foregoing.

Typically, each entertainment delivery unit 100 comprises a suitably programmed IBM-compatible 80486 based or Pentium based computer, preferably a fast computer such as, for example, a 133 MHz Pentium based computer. Particularly, each entertainment delivery unit 100 may comprise an appropriate laptop computer suitably modified, as is well known in the art, for installation in a fixed position. In the particular example shown in FIG. 1, each entertainment delivery unit 100 may be installed fixed in a seat back or bulkhead in front of an airplane passenger, although it is appreciated that alternative modes of installation are possible.

Preferably, each entertainment delivery unit 100 comprises entertainment presentation apparatus, such as a display screen 105, which is operative to deliver entertainment in a form detectable by the senses of a user of the entertainment delivery unit 100. The display screen 105, when equipped with appropriate audio headphones (not shown) operatively attached thereto, is believed to be a preferable choice of entertainment display apparatus for display of audio-video entertainment, but it is appreciated that other choices of entertainment presentation apparatus may be preferable depending on the form of entertainment provided such as, for example, audio apparatus alone for audio entertainment.

Preferably, each entertainment delivery unit 100 includes input apparatus (not shown) suitable for use by a possibly unsophisticated user such as, for example, a touch sensitive screen, as is well known in the art. It is appreciated that, alternatively, any of a wide variety of appropriate input apparatus may be used.

Preferably, at least some entertainment delivery units 100 include telecommunications apparatus such as a telephone 108, a modem connection (not shown), a facsimile machine (not shown), or any other appropriate telecommunications apparatus in operative communication with the entertainment delivery unit 100.

Each of the plurality of entertainment delivery units 100 is connected to an entertainment source 110 via entertainment distribution apparatus 120. The entertainment distribution apparatus 120 typically comprises suitable industry-standard network controllers and wiring compatible with the entertainment delivery units 100. Alternatively, other appropriate apparatus such as, for example, the apparatus described in U.S. Pat. No. 4,866,515 to Tagawa et al., referred to above, may be used.

The entertainment source 110 typically comprises a suitably programmed appropriate server computer such as, for example, a UNIX server, equipped with mass storage apparatus such as, for example, one or more of the following: one or more magnetic disks; one or more CD ROM drives; one or more DVD (digital video disk) units. In a case where the entertainment comprises audio entertainment, the entertainment source 110 typically serves high-quality audio such as, for example, compressed digital audio as is well known in the art, via the entertainment distribution apparatus 120 to one or more of the entertainment delivery units 100. Similarly, in a case where the entertainment comprises video entertainment, the entertainment source 110 typically serves high-quality video such as, for example, MPEG-2 video, which is well known in the art, to one or more of the entertainment delivery units 100. Entertainment sources and entertainment distribution apparatus having such capabilities are well known in the art and are widely used, for example, in distributing audio and video data via the Internet.

Each of the plurality of entertainment delivery units 100 preferably comprises personalization apparatus 130. The personalization apparatus 130 is preferably adapted to receive a removable personalization element such as, for example, a smart card 140, and thus typically comprises a smart card reader, as is well known in the art. For purposes of simplicity in describing the present invention, the case of a smart card 140 will be described throughout the present specification. It is appreciated, however, that another appropriate type of removable personalization element such as, for example, an electronically encoded key or any other kind of encoded medium, may alternatively be used.

The smart card 140, as is well known in the art, may be operative to store data in a memory (not shown) embedded therein and/or to execute computer programs on a processor (not shown) embedded therein, and to output stored data and/or the results of program execution. The smart card 140 preferably comprises both an embedded memory and an embedded processor, and preferably stores therein personalization information relating to an owner thereof. Typically, the personalization information includes at least one of the following: entertainment preference information, such as information on types of entertainment preferred by the owner of the smart card 140; gaming information, such as information on gaming preferences, betting limits, or other gaming information relating to the owner of the smart card 140; and telecommunications information such as identifying information sufficient to allow directing of telecommunications, as described below, to the owner of the smart card 140.

It is appreciated that the smart card 140 may also store data or execute programs which are unrelated to the operation of the system of FIG. 1, so that the smart card 140 may also function in conjunction with other systems, such as a pay television system, an electronic cash system, or an airline reservation system, as is well known in the art. It is further appreciated that the smart card 140 may also store other data related to use of the smart card 140 such as, for example, specific game information showing a level achieved in a particular game, and that such other data may be comprised in the personalization data in a future use of the smart card 140. It is further appreciated that, in the case where specific game information showing a level achieved in a particular game is comprised in the personalization data in a future use of the smart card 140, the system of FIG. 1 may be operative, during the future use, to allow a user to continue playing the particular game at the point at which the user previously left off playing the game. It is also appreciated, in such a case, that the future use may take place at a different location and in a different system constructed and operative according to the embodiment of FIG. 1.

The system of FIG. 1 also typically comprises an antenna 150 (shown in FIG. 2) which may be any suitable antenna operative to receive entertainment transmissions, including satellite entertainment transmissions. It is appreciated that, if various types of incoming transmissions are to be received, various types of antenna may be used, possibly including a plurality of antennas. In a case where satellite entertainment transmissions are to be received, a suitable satellite antenna system such as a Hughes-Avicom antenna system described in *Direct Broadcast Satellite TV For Airborne Applications*, referred to above, is preferred. Although the use of the antenna 150 for reception is generally described throughout the present specification, it is appreciated that two-way communication including transmission may be included in the present invention and that transmission may be accomplished by any appropriate method known in the art, including standard radio transmission and transmission to a satellite using a VSAT (very small aperture terminal) or other appropriate apparatus. Preferably, transmission may be used to transmit voice conversations, data connections, electronic mail, or any other appropriate communication.

The operation of the system of FIG. 1 is now briefly described. A user of one of the entertainment delivery units 100 places a smart card 140 into operative engagement with the personalization apparatus 130. Typically, the personalization apparatus 130 is operative to determine the validity of the smart card 140 and to reject a smart card 140 found invalid by, for example, displaying an appropriate message on the display screen 105. The determination of validity of the smart card 140 may be accomplished using any method well known in the art such as, for example, methods described in U.S. Pat. No. 4,748,668 to Shamir et al., which is hereby incorporated herein by reference.

The smart card 140, as described above, typically includes entertainment preference information. When the smart card 140 is properly inserted into the personalization apparatus 130, and after the validity of the smart card 140 has been determined as described above, the personalization apparatus 130, typically under control of the entertainment delivery unit 100, is operative to read the entertainment preference information from the smart card 140 and to communicate the entertainment preference information to the entertainment delivery unit 100.

Preferably, the entertainment delivery unit 100 is operative to communicate the personalization information to the entertainment source 110. The entertainment delivery unit 100 and/or the entertainment source 110 are then operative to personalize entertainment delivered to the user of the entertainment delivery unit 100 based on the entertainment preference information. It is appreciated that some personalization may occur in, for example, any of the following ways: the entertainment delivery unit 100 may personalize information received from the entertainment source 110; the entertainment source 110 may personalize information delivered to the entertainment delivery unit 100; or personalization may occur through any combination of the above. For simplicity in describing the present invention, personalization will generally be described below as if personalization is accomplished by the entertainment delivery unit 100, or otherwise as is convenient to the description. It is appreciated, however, that personalization may generally occur in a wide variety of ways.

It is appreciated that, by the process described above, the entertainment delivery unit 100 is typically personalized to the holder of the smart card 140. In the case of an airplane, for example, it is appreciated that the seat in which a passenger sits may be thus personalized to and identified with the passenger for the duration of the airplane trip. Alternatively, it is appreciated that a passenger may move from seat to seat during an airplane trip, in which case the holder of the smart card 140 will preferably remove the smart card 140 from operative association with the entertainment unit 100 at the holder's former seat and place the smart card 140 into operative association with the entertainment unit 100 at the holder's new seat, thus ending the personalization of the holder's former seat to the holder and personalizing the new seat to the holder.

In a case where the personalization information comprises entertainment preference information, such as information on types of entertainment preferred by the owner of the smart card 140, the entertainment delivery unit 100 is preferably operative to personalize entertainment generally, as described below. It is appreciated that personalization of entertainment may also comprise personalization of advertisements that are provided together with the entertainment. Methods of providing personalized advertisements in general are well known in the art, particularly in the Internet World Wide Web, and similar methods are typically applicable to providing personalized advertisements in the present invention.

In a case where the personalization information comprises gaming information, such as information on gaming preferences, betting limits, stored credit for use in betting, or other gaming information relating to the owner of the smart card 140, the entertainment delivery unit 100 is preferably operative to personalize gaming delivered to the entertainment delivery unit 100 in accordance with the entertainment preference information. The personalization may, for example, comprise one or more of the following:

offering or allowing participation in particular games, including one-player games and many-player games in which users of one or more other entertainment delivery units 100 may participate;

offering participation in a particular variation of a game;

enforcing one or more betting limits, typically including one or more of the following: maximum amount for a single bet; maximum amount for all bets together, maximum number of bets; maximum amount won over all bets together; maximum amount lost over all bets together; and exchanging or reconciling sums to be bet or sums won or lost through betting or credit limit sums with other sums, also typically stored in the smart card 140 such as, for example, airline frequent flyer miles or other "loyal customer" credits.

In a case where the personalization information comprises telecommunications information such as identifying information sufficient to allow directing of telecommunications to the owner of the smart card 140, the entertainment source 110 is preferably operative to personalize incoming telecommunications (not shown in FIG. 1) by directing telecommunications intended for the owner of the smart card 140 to the entertainment delivery unit 100 in which the smart card 140 is inserted, specifically to telecommunications apparatus comprised therein, such as the telephone 108.

Figure 3:
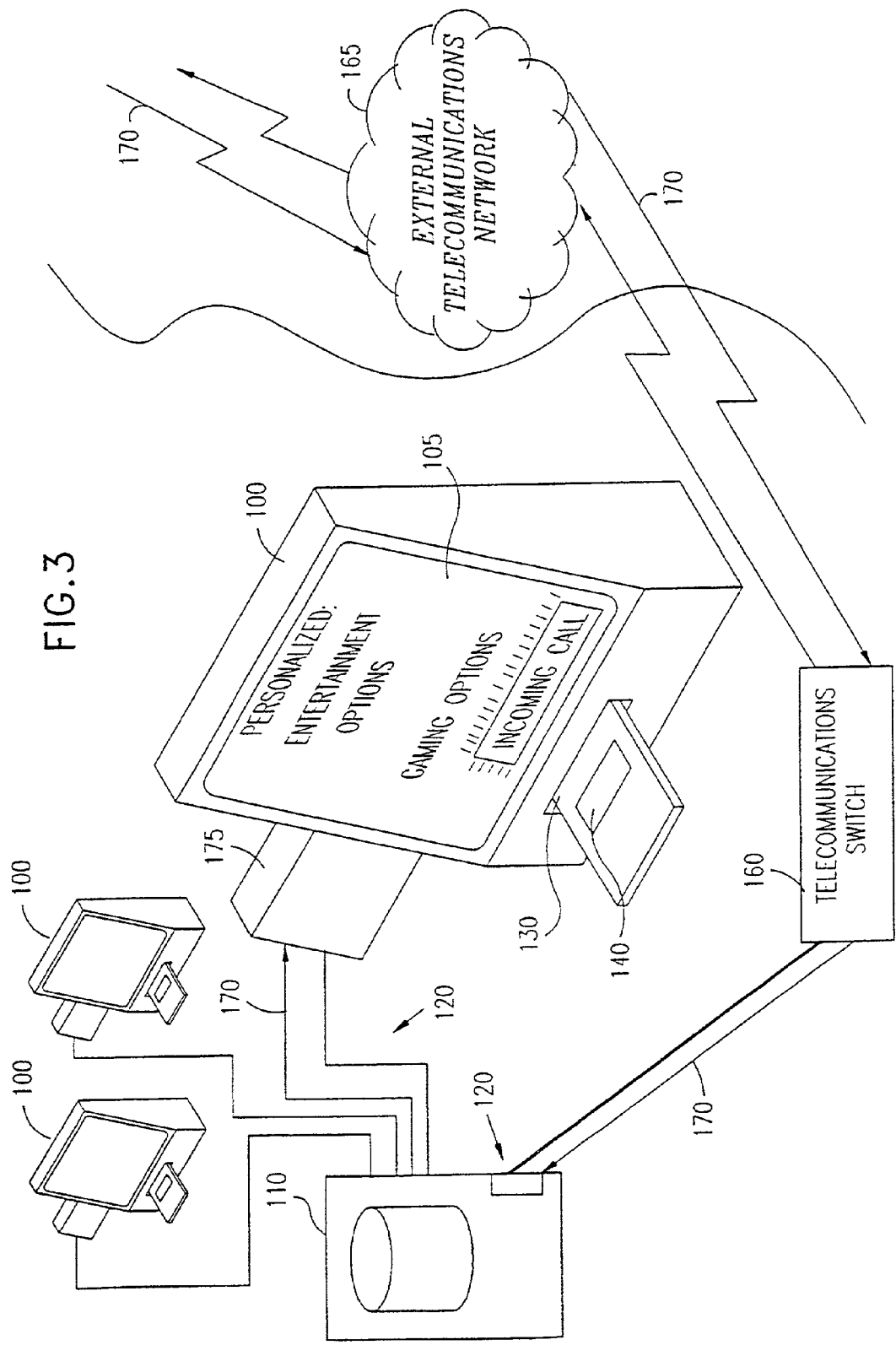
FIG. 3 is a simplified partially pictorial, partially block diagram illustration of a preferred implementation of a portion of the system of FIG. 1.

Reference is now made to FIG. 3, which is a simplified partially pictorial, partially block diagram illustration of a portion of the system of FIG. 1. The apparatus of FIG. 3 comprises the plurality of entertainment delivery units 100 and the entertainment source 110. The apparatus of FIG. 3 also comprises a telecommunications switch 160, which may comprise any appropriate telecommunications switch capable of switching telecommunications calls between the entertainment source 110 and an external telecommunications network 165. In a case where the system of FIG. 1 is comprised within a vehicle such as an airplane, the telecommunications switch 160 is preferably operable to maintain wireless communication with the external communications network 165. It is appreciated that the entertainment source 110 may comprise the telecommunications switch 160.

As described above with reference to FIG. 1, upon insertion of a smart card 140 comprising telecommunications information into the personalization apparatus 130, the entertainment delivery unit 100 is preferably operative to personalize incoming telecommunications. For example, the telecommunications information may comprise a telephone number or other telecommunications number personally assigned to the owner of the smart card 140, and the entertainment delivery unit 100 may be operative to personalize incoming telecommunications by communicating the telephone number or other telecommunications number to the entertainment source 110. Upon receiving, from the telecommunications switch 160, an incoming call 170 directed to the telephone number or other telecommunications number belonging to the owner of the smart card 140, the entertainment source 110 is preferably operative to direct the incoming call 170 to the entertainment delivery unit 100 being used by the owner of the smart card 140.

Typically, the entertainment delivery unit 100 comprises send/receive apparatus 175 which is operative to send information to and receive information from the entertainment source 110 via the entertainment distribution apparatus 120. As is well known in the art, the send/receive apparatus 175 typically comprises network hardware appropriate to the entertainment distribution apparatus 120.

It is appreciated that the actual direction of the call may be performed by the telecommunications switch 160 under direction of the entertainment source 110. It is further appreciated that, in order for the incoming call 170 to be directed to the telecommunications switch 160 comprised in the apparatus of FIG. 3, the external communications network 165 must contain information indicating the location of the owner of the smart card 140 within, for example, the vehicle in which the apparatus of the smart card 140 is comprised. It is appreciated that such information may be communicated to the external telecommunications network 165 before the owner of the smart card 140 boards the vehicle, may be communicated to the external telecommunications network 165 by the telecommunications switch 160 after the smart card 140 is placed in operative engagement with the personalization apparatus 130, or may be otherwise made available to the external telecommunications network 165.

It is further appreciated that an incoming call may originate, for example, by a call being placed to a central telephone number such as, for example, a telephone number which debits the caller and credits the operator of the telephone number. Such a call would typically be routed through the external telecommunications network 165 by a system (not shown) under control of an airline operating an airplane in which the apparatus of FIG. 1 is typically located.

In addition to and independent of routing of telecommunications to the entertainment delivery unit 100, the entertainment delivery unit 100 typically receives personalized entertainment and/or personalized gaming, which are typically displayed on the display 105, along with any indication of incoming telecommunications. It is appreciated that the user of the entertainment delivery unit 100 may then make selections from the personalized options presented to the user in accordance with any appropriate method well-known in the art for selecting options from a screen. It is believed that the use of a touch screen may be preferable.

Figure 4:
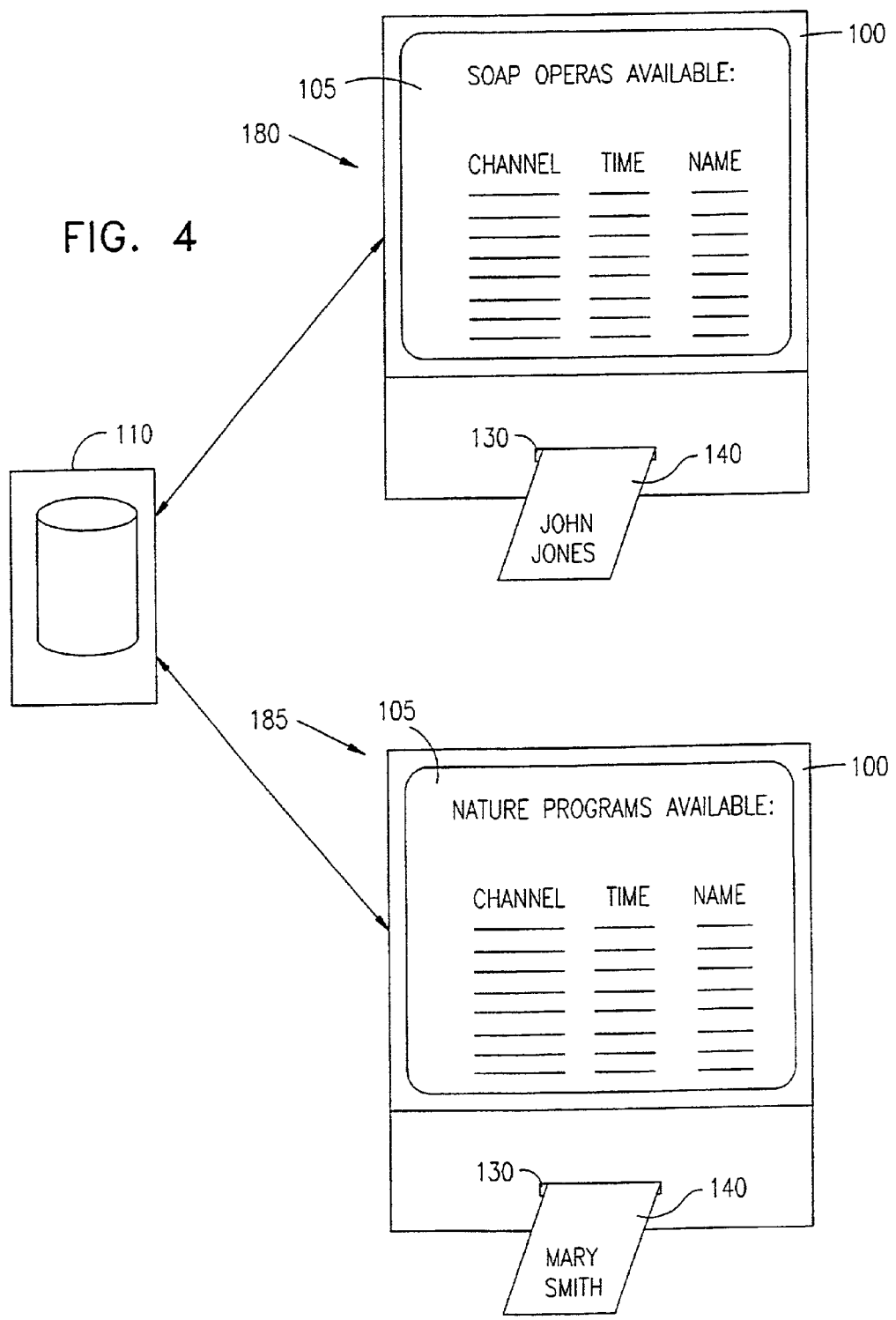
FIG. 4 is a simplified partially pictorial, partially block diagram illustration of a preferred implementation of a portion of the system of FIG. 3, showing utilization of the system for personalization of entertainment.

Reference is now made to FIG. 4, which is a simplified partially pictorial, partially block diagram illustration of a preferred implementation of a portion of the system of FIG. 1, showing utilization of the system for personalization of entertainment. The apparatus of FIG. 4 comprises a first entertainment delivery unit 180 having a first smart card 140 of a first user, John Jones, in operative engagement with a first personalization apparatus 130 comprised in the first entertainment delivery unit 180. Entertainment choices shown on a first display screen 105 are personalized to the user, in this case comprising choices of available soap operas for viewing.

The apparatus of FIG. 4 also comprises a second entertainment delivery unit 185 having a second smart card 140 of a second user, Mary Smith, in operative engagement with a second personalization apparatus 130 comprised in the second entertainment delivery unit 185. Entertainment choices shown on a second display screen 105 are personalized to the user, in this case comprising choices of available nature programs for viewing.

Figure 5:
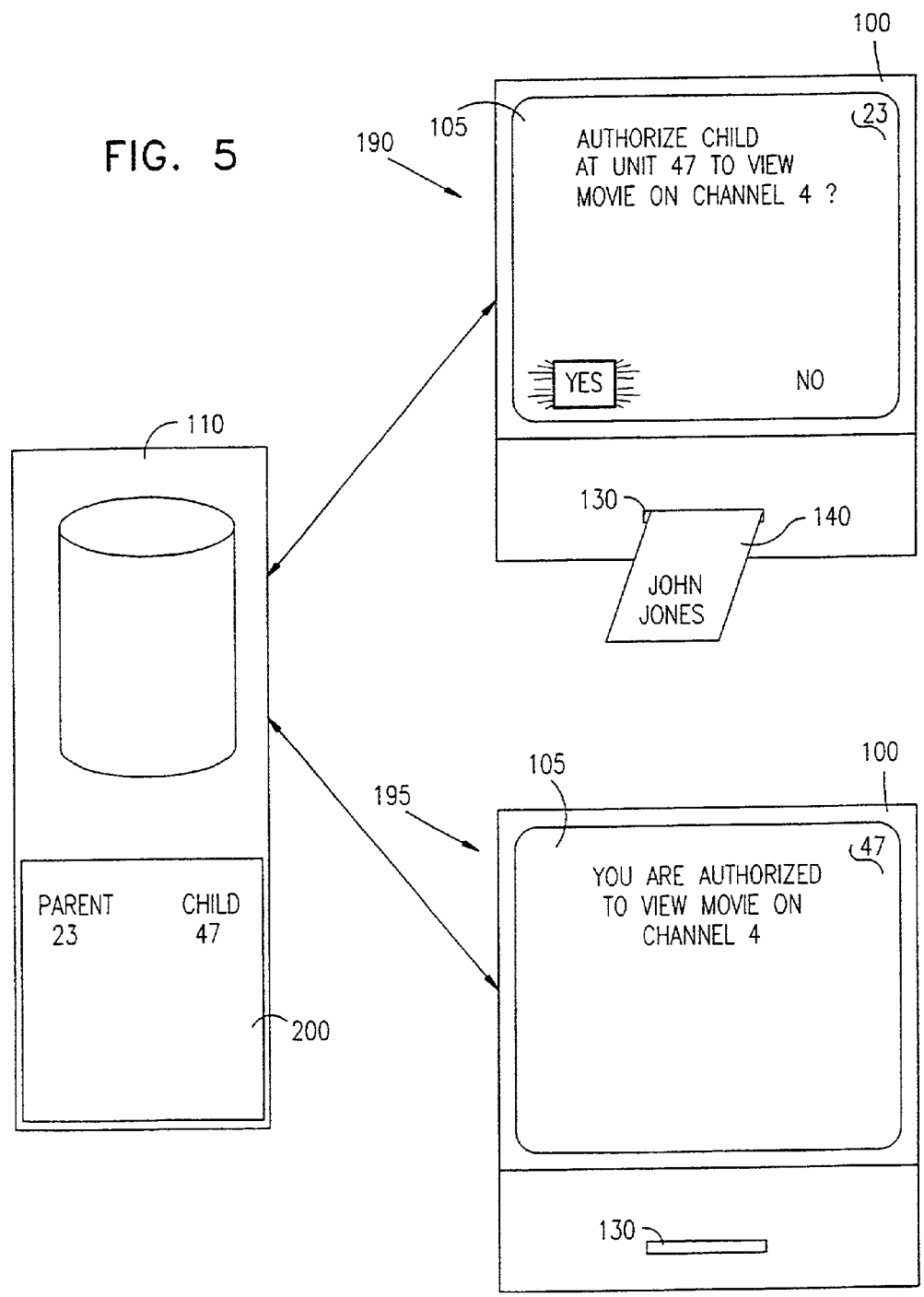
FIG. 5 is a simplified partially pictorial, partially block diagram illustration of a preferred implementation of a portion of the system of FIG. 3, showing utilization of the system for parental control.

Reference is now made to FIG. 5, which is a simplified partially pictorial, partially block diagram illustration of a preferred implementation of a portion of the system of FIG. 3, showing utilization of the system for parental control. The apparatus of FIG. 5 comprises a first entertainment delivery unit 190 having a smart card 140 of a user, John Jones, in operative engagement with a first personalization apparatus 130 comprised in the first entertainment delivery unit 190. The apparatus of FIG. 5 also comprises a second entertainment delivery unit 195 not having a smart card 140 in operative engagement with the second personalization apparatus 130 therein comprised. It is appreciated that, alternatively, a second smart card 140 may be in operative engagement with the second personalization apparatus 130.

In FIG. 5, the entertainment source 110 comprises stored information 200 characterizing parent-child associations between, on the one hand, at least one entertainment delivery unit 100 personalized to a parent and, on the other hand, at least one entertainment delivery unit 100 being used by a child. In the example of FIG. 5, in the stored information 200 the first entertainment delivery unit 190, internally referred to as unit 23, is designated as the parent of the associated second entertainment delivery unit 190, internally referred to as unit 47. It is appreciated that information on parent-child associations may be entered by the operator of a system, may be indicated by insertion of a smart card 140 and entry of additional information in each associated entertainment delivery unit 100, or by other means.

When the child user of the second entertainment delivery unit 195 requests to access a particular item of entertainment that has a rating requiring parental consent for viewing, also termed herein a "rated item", a request is preferably sent by the second entertainment delivery unit 195 through the entertainment source 110 to the first entertainment delivery unit 190, the request including sufficient identifying information to allow the parent using the first entertainment delivery unit 190 to determine characterizing information about the rated item. The parent may then determine whether or not to give consent for the child to access the rated item. The consent may be given or withheld, for example, by choosing "YES" or "NO", respectively, in response to a question displayed on the display screen 105 of the first entertainment delivery unit 190, with an indication of the giving or withholding of consent being preferably displayed on the display 105 of the second entertainment delivery unit 195.

It is appreciated that the apparatus of FIG. 5 may also be operative to allow a parent to control spending by a child, even when no explicit parental rating is involved. Furthermore, a wide variety of other options is also appreciated to be possible; for example, a parent may pre-authorized a child to view programs of a certain rating; parental authorization may be contingent on input of a personal identification number (PIN) or other identification item; or any combination of any of the options discussed with regard to FIG. 5 may be used. It is further appreciated that, in a case where the apparatus of FIG. 5 is in two way telecommunications with an external telecommunications system, as described above with reference to FIG. 1, parental control may also be exercised via the external telecommunications system, the parent being located remotely and in remote telecommunication with the apparatus of FIG. 5.

Figure 6:
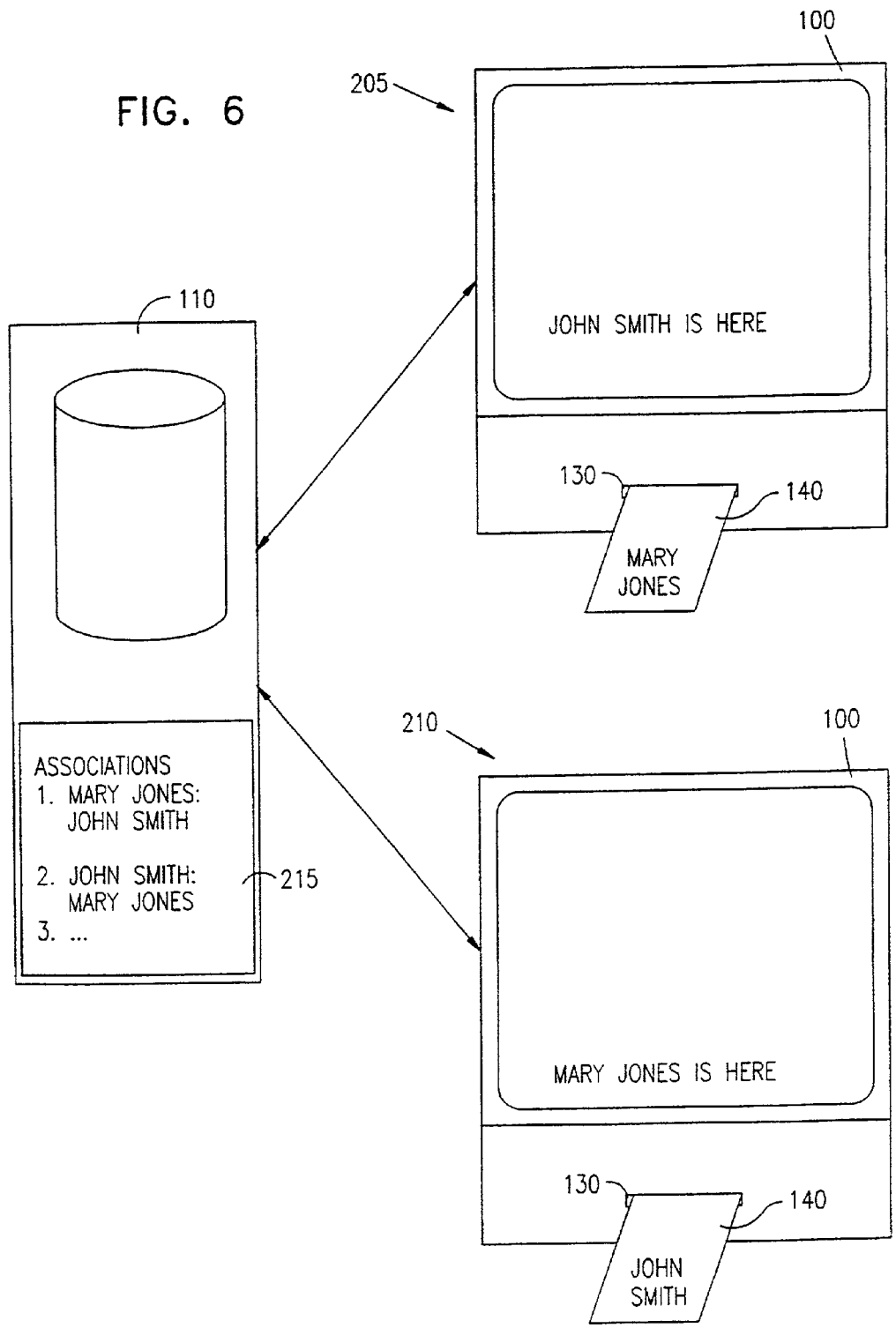
FIG. 6 is a simplified partially pictorial, partially block diagram illustration of a preferred implementation of a portion of the system of FIG. 3, showing utilization of the system for indicating the presence of a second user of the system to a first user of the system.

Reference is now made to FIG. 6, which is a simplified partially pictorial, partially block diagram illustration of a preferred implementation of a portion of the system of FIG. 3, showing utilization of the system for indicating the presence of a second user of the system to a first user of the system. In FIG. 6 a first smart card 140 is in operative association with a first personalization apparatus 130 of a first entertainment delivery unit 205. The first smart card 140 belongs to a first owner, depicted in FIG. 6 as "Mary Jones".

The personalization information comprised in the first removable smart card 140 indicates an association with a second owner, depicted in FIG. 6 as "John Smith", whose second smart card 140 is in operative association with the second personalization apparatus 130 of a second entertainment delivery unit 210. Similarly, the personalization information comprised in the second smart card 140 indicates an association with the first owner "Mary Jones". It is appreciated that, in general, the personalization information need not be two-way; that is, the smart card 140 of "John Smith" might show an association with "Mary Jones", but not vice versa.

The entertainment source 110 comprises stored information 215 which includes information defining the associations determined by the personalization information comprised in the plurality of smart cards 140. It is appreciated that the internal form of the stored personalization information might take a wide variety of forms including, for example, the actual name of the person with whom an association exists or any other identifying indication, such as an identifying number, which may preferably be stored in the smart card 140 owned by the person with whom the association exists. Further alternatively, a particular characteristic such as, for example, a preference for playing a particular game such as chess may be stored, in which case the entertainment source 110 might be operative to match persons having similar preferences and display an appropriate message on the entertainment units 100 associated with the persons so matched.

The entertainment source 110 is preferably operative, based on the stored information 215, to display an indication on the first entertainment delivery unit 205 of the presence of any persons with whom the owner of the first smart card 140 has an association. Typically, the apparatus of FIG. 6 is comprised within an enclosed area such as a building or a vehicle, and in such case the indication represents an indication of the presence within the enclosed area of the person with whom the owner of the first smart card 140, such as "Mary Jones", has an association, such as "John Smith". It is appreciated that displaying an indication of a person with whom an association exists may be particularly useful in assisting users of the apparatus of FIG. 6 to identify the presence of such persons within a large enclosed area, where such persons may not be otherwise visible to the users.

Figure 7A:
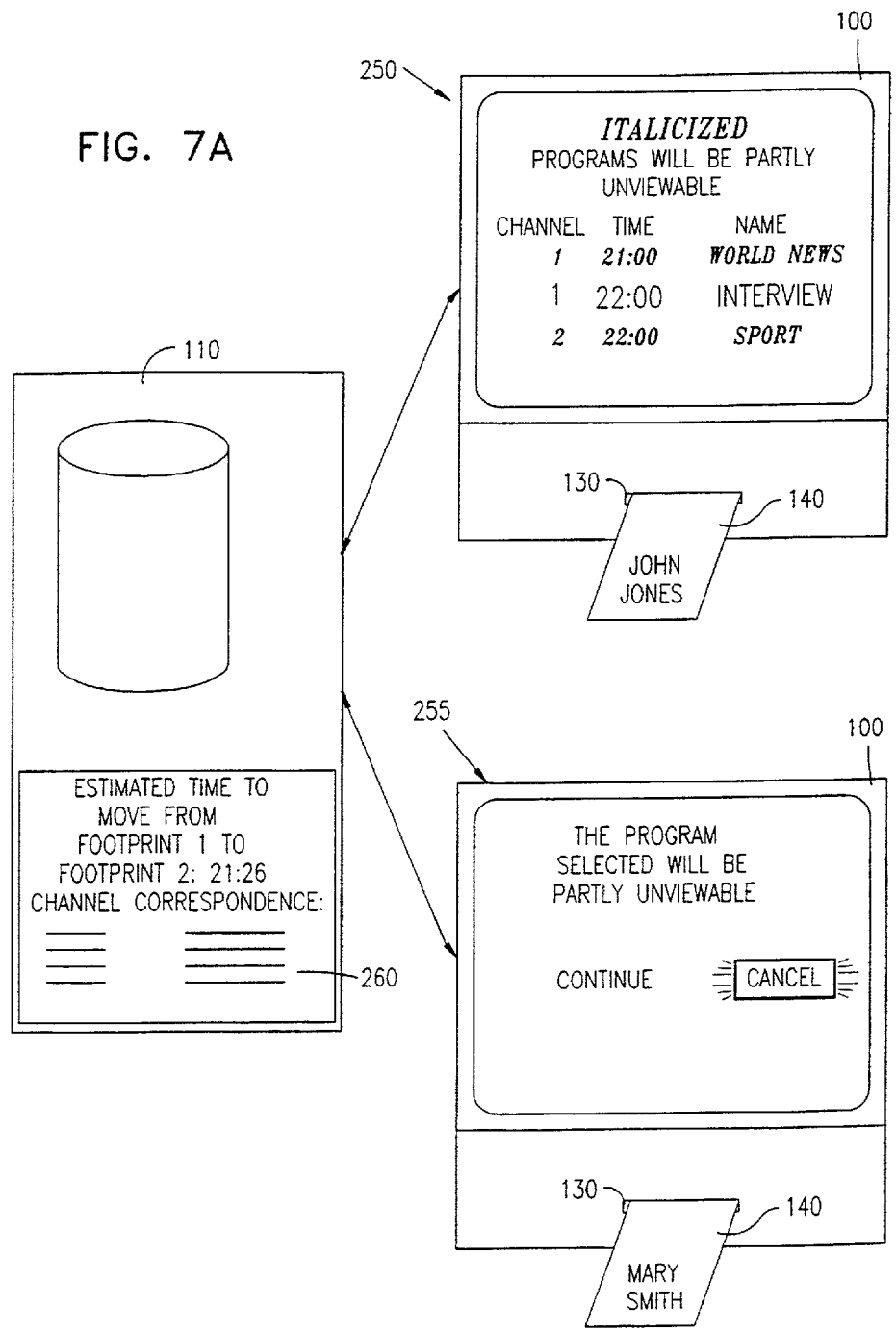
FIG. 7A is a simplified partially pictorial, partially block diagram illustration of a preferred implementation of a portion of the system of FIG. 3, showing utilization of the system for indicating expected unavailability of entertainment items.

Reference is now made to FIG. 7A which is a simplified partially pictorial, partially block diagram illustration of a preferred implementation of a portion of the system of FIG. 3, showing utilization of the system for indicating expected unavailability of entertainment items. It is appreciated that, in a case where the system of FIG. 3 is comprised within a vehicle, the vehicle may move over time. Satellite transmissions received, as, for example, at the antenna 150 of FIG. 2, at a first time may not be received at a second time, due to movement of the vehicle.

Figure 7B:
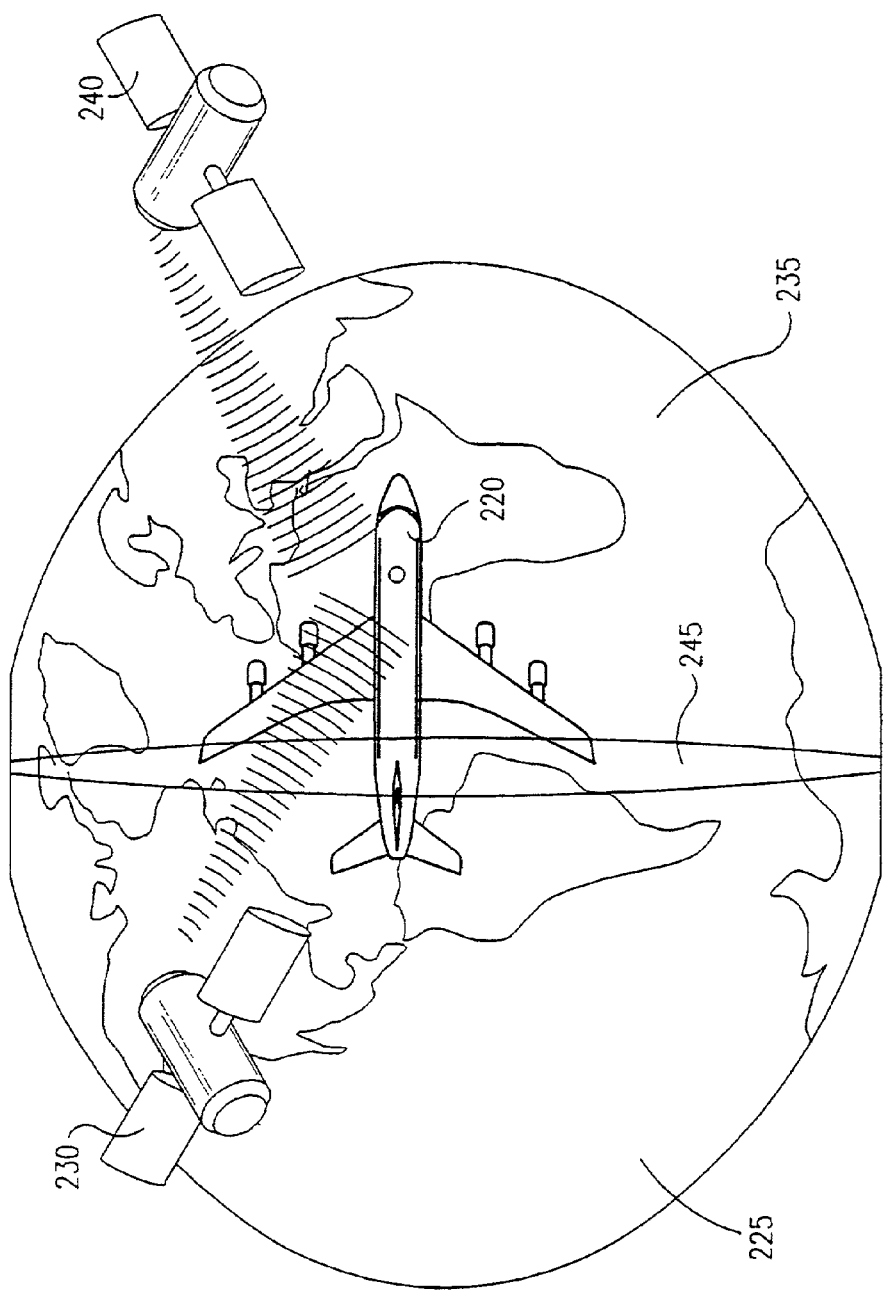
FIG. 7B is a simplified pictorial illustration of a vehicle passing from a first footprint of a first satellite to a second footprint of a second satellite.

Reference is now additionally made to FIG. 7B, which is a simplified pictorial illustration of a vehicle passing from a first footprint of a first satellite to a second footprint of a second satellite. In FIG. 7B an airplane 220 is shown passing from a first broadcast footprint 225 of a first satellite 230 into a second broadcast footprint 235 of a second satellite 240, passing through a border region 245 between the first footprint 225 and the second footprint 235. It is appreciated that the aspects of the present invention described with reference to FIGS. 7A and 7B may be useful in any moving vehicle, and that the depiction and description of the airplane 220 in this regard is by way of example only.

As is well known in the art, a broadcast satellite such as the first satellite 230 or the second satellite 240 typically is associated with a region, known as a broadcast footprint, in which signals broadcast by the satellite may be easily received. A border region between two such satellite footprints, such as the border region 245, may be a region of marginally acceptable reception of broadcasts of one or more satellites or may be a region of poor reception of broadcasts from all satellites, as is well known in the art.

While footprints and border regions are generally defined on the surface of the earth since most receivers are located on the surface of the earth, it is appreciated that footprints and border regions may be understood to extend upward so that an airplane such as the airplane 220 flying generally over a footprint may be considered to be within the footprint.

In an entertainment system receiving satellite broadcast transmissions in a moving vehicle, as in a preferred embodiment of the present invention, a problem may arise in providing entertainment to users of the system, such as the system of FIG. 3, because movement of the airplane 220 from the first footprint 225 to the second footprint 235 may cause certain broadcast entertainment programs to become unavailable, because the programs may not be transmitted by the second satellite 240. Furthermore, a program available on a given entertainment channel within the first footprint 225 may be available on a different channel within the second footprint 235. Therefore, a user of the system of FIG. 3 may be required to tune between channels, typically while the airplane 220 is located in the border region 245, in order to continue to continue to receive the program.

The apparatus of FIG. 7A comprises a first entertainment delivery unit 250 and a second entertainment delivery unit 255. The first entertainment delivery unit 250 displays a program guide, based on information received from the entertainment source 110, indicating that certain programs will be partly unviewable, typically because a vehicle in which the apparatus of FIG. 7A is located is expected to move, for example, from the first footprint 225 to the second footprint 235 during the program, and the program is not being broadcast within the second footprint 235. The apparatus of FIG. 7A also comprises a second entertainment delivery unit 255 which displays an indication that a program selected by the user thereof will be partly unavailable, typically for the same reason described above with respect to the first entertainment delivery unit 250.

Typically, the entertainment source 110 comprises footprint information 260 which is used by the entertainment source 110 in order to determine whether or not a given program will be available, or entirely available. The footprint information 260 typically comprises an indication of the expected time of transition from the first footprint 225 to the second footprint 235. It is appreciated that a variety of methods may be used to determine the expected time of transition. Preferred methods for determining the expected time of transition include use of one or more of the following methods:

using computation to determine the location of the airplane 220 relative to the first footprint 225 and the second footprint 235, as described in more detail below with reference to FIG. 10A;

using a measure of quality to compare signals received from the first satellite 230 to signals received from the second satellite 240, as described in more detail below with reference to FIG. 11; and using an external signal to determine the time of transition from the first footprint 225 to the second footprint 235, as described in more detail below with reference to FIG. 12.

Preferred methods of operation of the apparatus of FIG. 7A are also described below with reference to FIG. 13.

The footprint information 260 also typically comprises an indication of which broadcast channels of entertainment available in the first footprint 225 correspond to which broadcast channels of entertainment available in the second footprint 235. It is appreciated that broadcast channel availability information may be derived from a number of sources such as, for example, from availability information broadcast by the first satellite 230 and/or the second satellite 240 or from availability information preloaded into the footprint information 260.

Figure 8A:
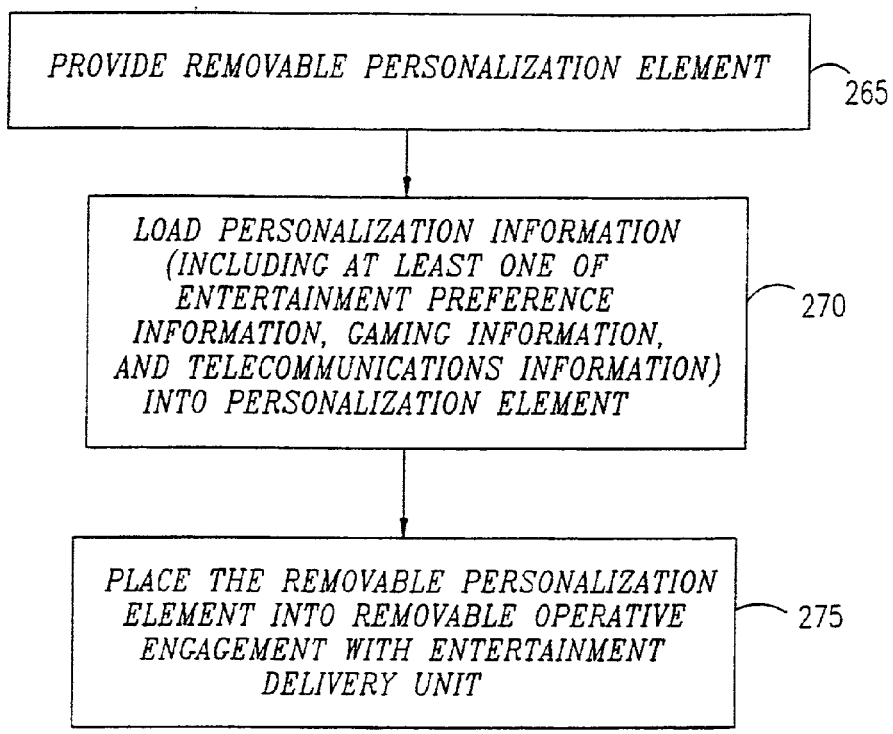
FIG. 8A is a simplified flowchart illustration of a preferred method of operation of the system of FIG. 1.

Reference is now made to FIG. 8A, which is a simplified flowchart illustration of a preferred method of operation of the system of FIG. 1. The method of FIG. 8A preferably comprises the following steps:

A removable personalization element is provided (step 265) and loaded with personalization information (step 270). The personalization information, as described in greater detail above, typically includes at least one of entertainment preference information, gaming information, and telecommunications information. As described in greater detail above, the personalization element typically comprises a smart card. It is appreciated that step 270 may be performed, for example, upon purchase of the smart card, upon performing a transaction with the smart card, upon using the smart card in conjunction with the system of FIG. 1 or any other system accepting the smart card, or at any other convenient time.

The personalization element is placed into removable operative engagement with an entertainment delivery unit (step 275). It is appreciated that the behavior of the entertainment delivery unit with the personalization element in removable operative engagement therewith is generally as described above with reference to FIGS. 1–7B, and also as described below.

Reference is now made to FIG. 8B, which is a simplified pictorial illustration of a system comprising an interactive terminal accepting a removable personalization element, the system constructed and operative in accordance with a preferred embodiment of the present invention. Reference is now additionally made to FIGS. 8C and 9, which are simplified flowchart illustrations of a preferred method of operation of the apparatus of FIG. 8B.

The apparatus of FIG. 8B comprises an interactive terminal 277, operative to receive at least one removable personalization element such as the smart card 140, when presented by a user. The interactive terminal 277 may be any appropriate interactive terminal such as, for example, one or any combination of the following: an automated teller machine; a ticket dispensing machine, such as an airline ticket dispensing machine; a public telephone, particularly a public telephone offering enhanced services; a public Internet terminal; or any other appropriate terminal accepting a removable personalization element. Typically, the user presents the smart card 140 in order to perform some action or transaction using the interactive terminal 277.

The smart card 140, in the embodiment of FIG. 8B, comprises a smart card as described above with reference to FIGS. 1–7B, including personalization information as described in greater detail above. It is therefore appreciated that presentation of the smart card 140 may alter the operation of the interactive terminal 277. In particular, the personalization information comprised in the smart card 140 may be operative, for example, to perform on or more of the following:

personalize behavior of the interactive terminal 277;

update credit information in a credit account accessed by the terminal 277, either by crediting or debiting the credit account based on personalization information, such as gambling information, comprised in the smart card 140; and resolve a monetary transaction, such as by paying off a debt or transferring a credit, including a frequent flyer credit or similar credit, based on personalization information.

The methods of FIGS. 8C and 9 are self-explanatory with reference to the above discussion of FIG. 8B.

Reference is now made to FIG. 10A, which is a simplified flowchart illustration of a preferred method of receiving a satellite broadcast transmission within a moving vehicle, useful in conjunction with the system of FIG. 1. FIG. 7B, described above, illustrates a typical situation in which the method of FIG. 10A might be particularly useful. The above description of FIG. 7B explains concepts such as broadcast footprint, which are useful in understanding the method of FIG. 10A. It is appreciated that an airplane is a typical example of a moving vehicle for the purposes of the method of FIG. 10A, but any other appropriate moving vehicle may also be used. The method of FIG. 10A preferably comprises the following steps:

Within a moving vehicle, a satellite broadcast transmission is received from a first satellite using first reception parameters (step 280). The first reception parameters typically include information necessary to successfully receive and tune the satellite broadcast transmission from the first satellite, such as, for example, one or more of the following: the position of the satellite; one or more frequencies used by the broadcast transmission; polarization parameters of the broadcast transmission, as are well known in the art; and other suitable parameters, particularly parameters well known in the art.

The broadcast transmission may include any appropriate broadcast transmission such as, for example, a television broadcast or a data broadcast such as a broadcast of computer data or computer software.

A current position of the moving vehicle is determined (step 285), based, for example, on inertial navigation or GPS information, as is well known in the art. Based typically on the results of step 285 and parameters of the moving vehicle, such a direction of travel and speed thereof, a future position of the moving vehicle is computed (step 290), typically using methods well known in the art.

A check is made to determine whether the future position of the moving vehicle, computed in step 290, is within a second broadcast footprint of a second satellite (step 293). If the future position is not within the second broadcast footprint, the method of FIG. 10A preferably continues with step 300, described below. If the future position is within the second broadcast footprint, the broadcast reception parameters used within the moving vehicle are adjusted to correspond to the broadcast reception parameters of the second satellite, thus causing a broadcast transmission from the second satellite to be received (step 296).

The satellite broadcast transmission being received is utilized within the moving vehicle (step 300). Preferably, as described above with reference to FIG. 7A, the at least one entertainment channel is provided to the at least one passenger without passenger intervention when the moving vehicle passes from the first footprint to the Reference is now additionally made to FIG. 10B, which is a simplified flowchart illustration of a preferred method of operation of steps 290 and 296 of FIG. 10A. Preferably, during step 290 of FIG. 10A, a transition time is computed, at which time the moving vehicle is expected to move into the second broadcast footprint (step 305). Preferably, during step 296 of FIG. 10A, the broadcast reception parameters are adjusted at the transition time (step 310).

Figure 11:
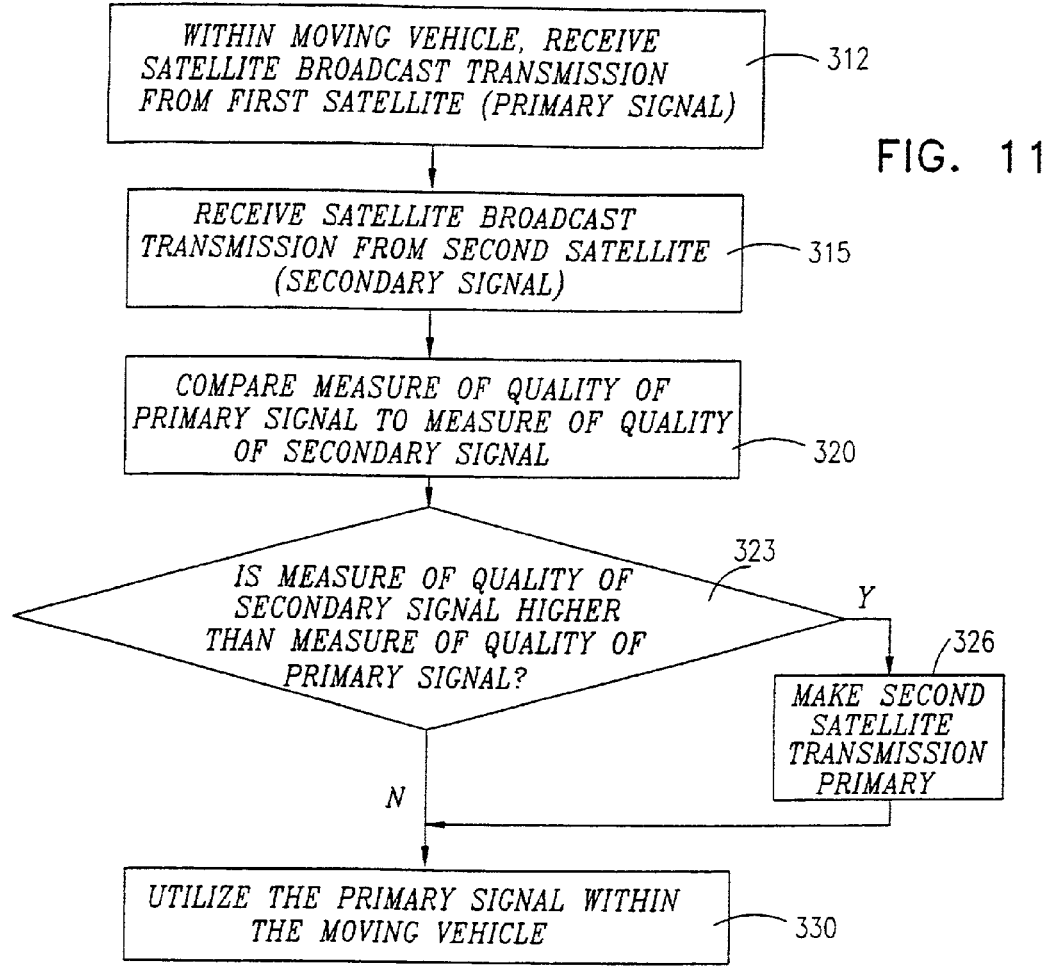
FIG. 11 is a simplified flowchart illustration of an alternative preferred method of receiving a satellite broadcast transmission within a moving vehicle, useful in conjunction with the system of FIG. 1.

Reference is now made to FIG. 11, which is a simplified flowchart illustration of an alternative preferred method of receiving a satellite broadcast transmission within a moving vehicle, useful in conjunction with the system of FIG. 1. FIG. 7B, described above, illustrates a typical situation in which the method of FIG. 11 might be particularly useful. The above description of FIG. 7B explains concepts such as broadcast footprint, which are useful in understanding the method of FIG. 11. It is appreciated that an airplane is a typical example of a moving vehicle for the purposes of the method of FIG. 11, but any other appropriate moving vehicle may also be used. The method of FIG. 11 preferably comprises the following steps:

Within a moving vehicle, a satellite broadcast transmission is received from a first satellite, and is designated as a primary signal (step 312). A satellite broadcast transmission is also received from a second satellite, and is designated as a secondary signal (step 315). A measure of quality is used to compare the primary signal to the secondary signal (step 320). Any of a wide variety of measures of quality may be used as the measure of quality in step 320 such as, for example, one more of the following: signal strength; variations in signal strength; error rate; or any other appropriate measure of signal quality well known in the art.

If the measure of quality of the secondary signal is not higher than the measure of quality of the primary signal (step 323), the method of FIG. 11 continues with step 330, described below. If the measure of quality of the secondary signal is higher than the measure of quality of the primary signal (step 323), the second satellite transmission becomes the primary signal (step 326) and, typically, the first satellite transmission becomes the secondary signal.

The primary signal is utilized within the moving vehicle (step 330). Utilizing the primary signal within the moving vehicle may comprise any appropriate type of utilizing such as, for example, utilizing the signal within the system of FIG. 1. Preferably, as described above with reference to FIG. 7A, the at least one entertainment channel is provided to the at least one passenger without passenger intervention when the moving vehicle passes from the first footprint to the second footprint, and the broadcast signal from the second satellite becomes primary.

Figure 12:
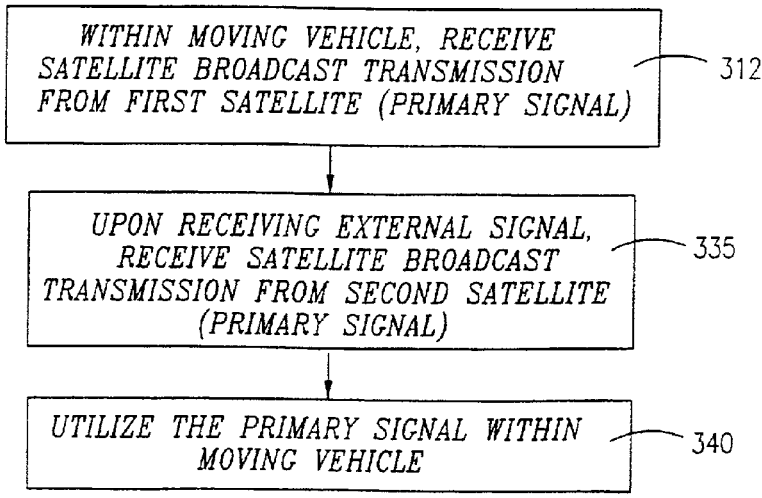
FIG. 12 is a simplified flowchart illustration of a further alternative preferred method of receiving a satellite broadcast transmission within a moving vehicle, useful in conjunction with the system of FIG. 1.

Reference is now made to FIG. 12, which is a simplified flowchart illustration of a further alternative preferred method of receiving a satellite broadcast transmission within a moving vehicle, useful in conjunction with the system of FIG. 1. FIG. 7B, described above, illustrates a typical situation in which the method of FIG. 12 might be particularly useful. The above description of FIG. 7B explains concepts which are useful in understanding the method of FIG. 12. It is appreciated that an airplane is a typical example of a moving vehicle for the purposes of the method of FIG. 12, but any other appropriate moving vehicle may also be used. The method of FIG. 12 preferably comprises the following steps:

Step 312, described above with reference to FIG. 11, is preferably performed. Upon receiving an external signal, a satellite broadcast transmission is received from a second satellite, and is treated as a primary signal (step 335). The external signal may typically be an external signal from a ground-based station, typically a station which is tracking a position of the moving vehicle, or an external signal from a satellite. The primary signal is utilized within the moving vehicle (step 340).

Typically, in step 340, the primary signal is utilized by providing at least one entertainment channel, comprised in the satellite broadcast transmission, to at least one passenger in the moving vehicle, typically in conjunction with the system of FIG. 1. Preferably, as described above with reference to FIG. 7A, the at least one entertainment channel is provided to the at least one passenger without passenger intervention when the moving vehicle passes from the first footprint to the second footprint, and the broadcast signal from the second satellite becomes primary.

Reference is now made to FIG. 13, which is a simplified flowchart illustration of a method of providing entertainment to a passenger of a moving vehicle, useful in conjunction with the system of FIG. 1. FIG. 7B, described above, illustrates a typical situation in which the method of FIG. 13 might be particularly useful. The above description of FIG. 7B explains concepts which are useful in understanding the method of FIG. 13, such as the concept of satellite footprint. It is appreciated that an airplane is a typical example of a moving vehicle for the purposes of the method of FIG. 13, but any other appropriate moving vehicle may also be used. The method of FIG. 13 preferably comprises the following steps:

A satellite broadcast transmission is received within a moving vehicle (step 345). A current position of the moving vehicle is determined, typically as described above with reference to step 300 of FIG. 10A (step 350). A future position of the moving vehicle at a critical program time is computed, typically using a method similar to that described above with reference to step 390 of FIG. 10A, and a determination is made as to whether the future position is within the satellite broadcast footprint (step 355).

Based on the determination in step 355, an entertainment channel is provided to a passenger of the moving vehicle (step 360). As explained above with reference to FIG. 7A, a particular program channel may preferably not be provided if it was determined, in step 355, that the program will be unavailable, because the moving vehicle will not be in the satellite broadcast footprint, at a critical program time.

The critical program time may typically be any time at which the program is expected to be broadcast. Typically, the provision of an entertainment channel to a passenger may include any one or more of the following: the passenger may be allowed to receive only channels available at the critical program time; the passenger may be cautioned regarding availability of an entertainment channel at the critical program time; and the passenger may be allowed to see any channel, without being cautioned, regardless of availability of the channel at the critical program time. The particular choice of the options for provision of an entertainment channel to a passenger may be based on predetermined factors, may be based on personalization information associated with the passenger, or may be determined in any other appropriate manner.

Optionally, a program guide may be provided (step 365) the program guide typically including at least one of the following: an indication of present channel availability; an indication of future channel availability; information about channels which only includes channels which will be available at the critical time.

Reference is now made to FIG. 14, which is a simplified flowchart illustration of an alternative method of providing entertainment to a user of the system of FIG. 1. The method of FIG. 14 is particularly applicable to the apparatus of FIG. 5, described above, but it is appreciated that the method of FIG. 14 may also have a wider applicability. The method of FIG. 14 preferably comprises the following steps:

A removable personalization apparatus is placed in operative engagement with a first personalization element in a first entertainment delivery unit (step 370). Entertainment is provided at a second entertainment delivery unit based on information received from the first entertainment delivery unit (step 375). It is appreciated that the information received from the first entertainment delivery unit may comprise any of a wide variety of types of information, including, for example, one or more of the following: parental control information; payment authorization information; personalization information comprised in the removable personalization apparatus; credit information; information provided by a passenger using the first entertainment delivery unit; and spending approval information.

It is further appreciated that a second removable personalization apparatus may be placed in operative engagement with the second entertainment delivery unit, but use of such a second removable personalization apparatus is appreciated to be optional in the method of FIG. 14.

Figure 15:
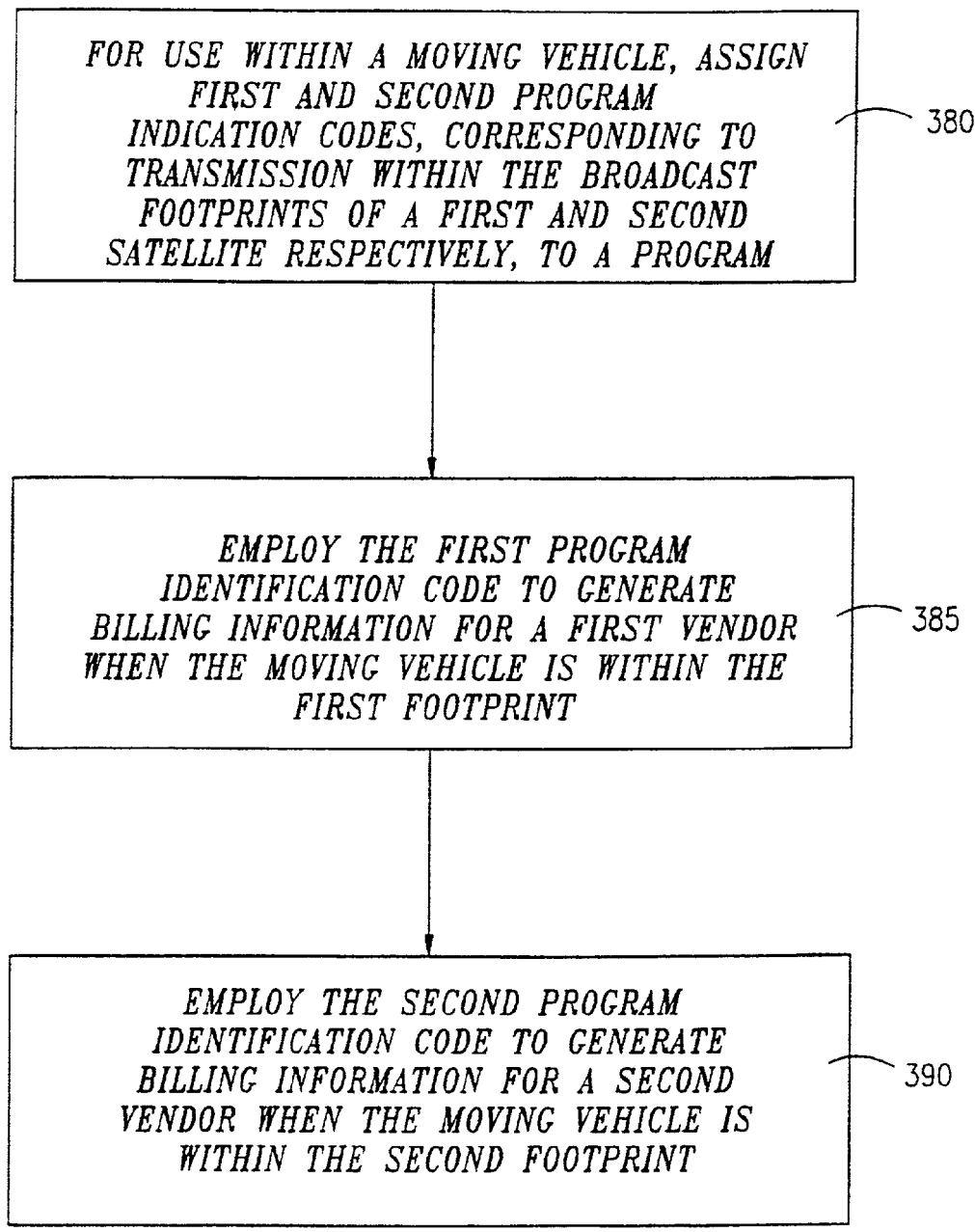
FIG. 15 is a simplified flowchart illustration of a method for providing billing of a subscriber of a satellite broadcast transmission within a moving vehicle, useful in conjunction with the system of FIG. 1.

Reference is now made to FIG. 15, which is a simplified flowchart illustration of a method for providing billing of a subscriber of a satellite broadcast transmission within a moving vehicle, useful in conjunction with the system of FIG. 1. The method of FIG. 15 is believed to be particularly useful in pay-per-view billing, in which a user of broadcast entertainment is billed for each item received or viewed, or according to a time period during which a broadcast was received or viewed.

FIG. 7B, described above, illustrates a typical situation in which the method of FIG. 15 might be particularly useful. The above description of FIG. 7B explains concepts which are useful in understanding the method of FIG. 15, such as the concept of satellite footprint. It is appreciated that an airplane is a typical example of a moving vehicle for the purposes of the method of FIG. 15, but any other appropriate moving vehicle may also be used. The method of FIG. 15 preferably comprises the following steps:

For use within the moving vehicle, first and second program identification codes are assigned to a program, the first and second program identification codes corresponding respectively to broadcast transmission within first and second broadcast satellite footprints (step 380). It is appreciated that, typically, first and second satellites will broadcast programs, possibly identical programs, provided by first and second broadcasters which are not identical. Therefore, it is desirable to separately track reception of programs within the first and second broadcast satellite footprints, corresponding respectively to the first and second broadcasters.

The first program identification code is employed to generate billing information for a first vendor, such as, for example, the first broadcaster, when the moving vehicle is within the first footprint (step 385). Similarly, the second program identification code is employed to generate billing information for a second vendor, such as, for example, the second broadcaster, when the moving vehicle is within the first footprint (step 390). It is appreciated that the first vendor and the second vendor need not necessarily be identical with the first broadcaster and the second broadcaster, respectively. It is further appreciated that the output of the method of FIG. 15, comprising billing information, may be further employed, as is well known in the art, to produce bills, to debit the user or another entity, or otherwise.

Figure 16B:
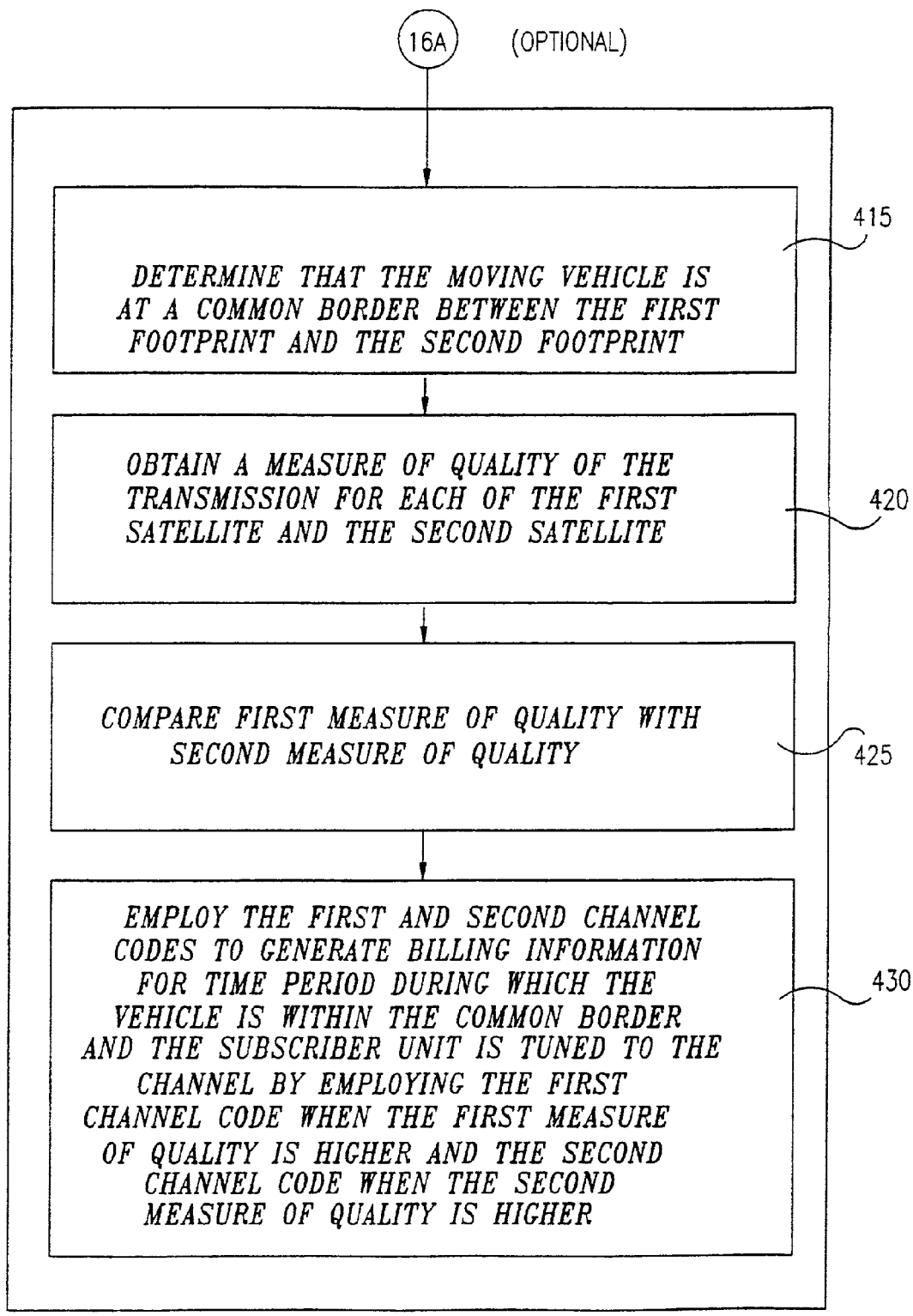

Reference is now made to FIGS. 16A and 16B, which, taken together, comprise a simplified flowchart illustration of an alternative method for providing billing of a subscriber of a satellite broadcast transmission within a moving vehicle, useful in conjunction with the system of FIG. 1. FIG. 7B, described above, illustrates a typical situation in which the method of FIGS. 16A and 16B might be particularly useful. The above description of FIG. 7B explains concepts which are useful in understanding the method of FIGS. 16A and 16B, such as the concept of satellite footprint. It is appreciated that an airplane is a typical example of a moving vehicle for the purposes of the method of FIGS. 16A and 16B, but any other appropriate moving vehicle may also be used. The method of FIGS. 16A and 16B preferably comprises the following steps:

For use within a moving vehicle, first and second channel identification codes are assigned to a channel, the first and second channel identification codes corresponding respectively to transmission within first and second broadcast footprints of first and second satellites (step 395). Typically, the channel may represent a single entertainment channel available to a user of the system, the channel typically providing one or more entertainment programs. A satellite broadcast is received from the first satellite when the vehicle is within the first broadcast footprint and from a second satellite when the vehicle is within the second broadcast footprint (step 400).

The first channel identification code is employed to generate billing information for a first vendor, such, for example, a first broadcaster, for a time period during which a subscriber unit in the moving vehicle is tuned to the channel within the first footprint that is, is tuned to the channel being broadcast from the first satellite (step 405). Similarly, the second channel identification code is employed to generate billing information for a second vendor, such, for example, a second broadcaster, for a time period during which a subscriber unit in the moving vehicle is tuned to the channel within the second footprint, that is, is tuned to the channel being broadcast from the second satellite (step 410). The billing information which is produced in steps 405 and 410 may be used, for example, as described above with reference to FIG. 15 for billing information therein.

The method of FIGS. 16A and 16B also optionally comprises the following steps:

A determination is made that the moving vehicle is at a common border between the first footprint and the second footprint (step 415). As may be understood with reference to FIG. 7B, the common border may comprise a border region which lies between the first footprint and the second footprint. It is appreciated that, within the border region, it may be possible, at different locations within the border region, to receive a satellite broadcast transmission from either one of the first satellite and the second satellite, or from both satellites with varying degrees of signal quality.

A measure of quality of the transmission is obtained for each of the first satellite and the second satellite (step 420). Each measure of quality may be similar to the measure of quality described above with reference to FIG. 11. The first measure of quality and the second measure of quality, for the first and second satellite respectively, are compared, using any appropriate method (step 425).

The first and second channel codes are employed to generate billing information for a time period during which the moving vehicle is within the common border and the subscriber unit is tuned to the channel, preferably as follows:

the first channel code is employed when the first measure of quality is higher; and the second channel code is employed when the second measure of quality is higher (step 430).

Reference is now made to FIG. 17, which is a simplified partly pictorial, partly block diagram illustration of a preferred embodiment of apparatus for carrying out the method of FIG. 10A, constructed and operative in accordance with an alternative preferred embodiment of the present invention. It is appreciated that the apparatus of FIG. 17 is only one example of an apparatus for carrying out the method of FIG. 10A.

The apparatus of FIG. 17 typically comprises apparatus 435 for receiving a broadcast within a moving vehicle. The elements comprised in the apparatus 435 are typically implemented in a combination of hardware and software. The elements comprised in the apparatus 435, and their typical relationship to the steps of the method of FIG. 10A, typically include the following:

a receiver 460, typically receiving signals from a first satellite 440 and a second satellite 450 and typically implementing step 280;

position determination apparatus 470, typically implementing step 285;

future position computation apparatus 480, typically implementing step 290;

a satellite reception adjustor 490, typically implementing steps 293 and 296; and utilization apparatus 500, typically implementing step 300.

Figure 18:
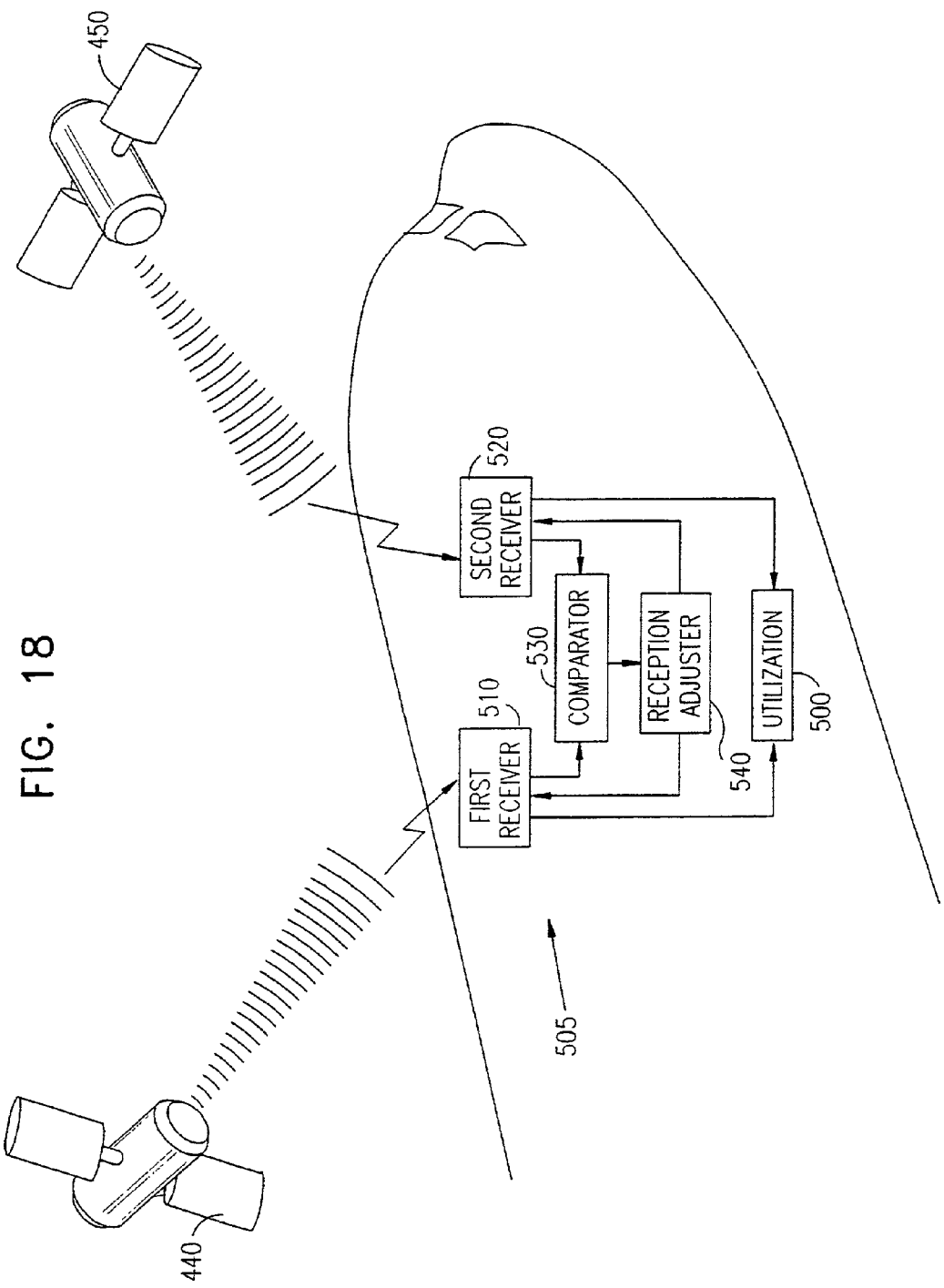
FIG. 18 is a simplified partly pictorial, partly block diagram illustration of a preferred embodiment of apparatus for carrying out the method of FIG. 11, constructed and operative in accordance with an alternative preferred embodiment of the present invention.

Reference is now made to FIG. 18, which is a simplified partly pictorial, partly block diagram illustration of a preferred embodiment of apparatus for carrying out the method of FIG. 11, constructed and operative in accordance with an alternative preferred embodiment of the present invention. It is appreciated that the apparatus of FIG. 18 is only one example of an apparatus for carrying out the method of FIG. 11.

The apparatus of FIG. 18 typically comprises apparatus 505 for receiving a broadcast within a moving vehicle. The elements comprised in the apparatus 505 are typically implemented in a combination of hardware and software. The elements comprised in the apparatus 505, and their typical relationship to the steps of the method of FIG. 11, typically include the following:

a first receiver 510, typically receiving signals from the first satellite 440 and typically implementing step 312;

a second receiver 520, typically receiving signals from the second satellite 450 and typically implementing step 315;

a comparator 530, typically receiving a first signal from the first receiver 510 and a second signal from the second receiver 520 and producing an output, and typically implementing step 320;

a reception adjuster 540, typically receiving the output signal from the comparator 530 and typically implementing steps 323 and 326; and utilization apparatus 500, typically implementing step 330.

Figure 19:
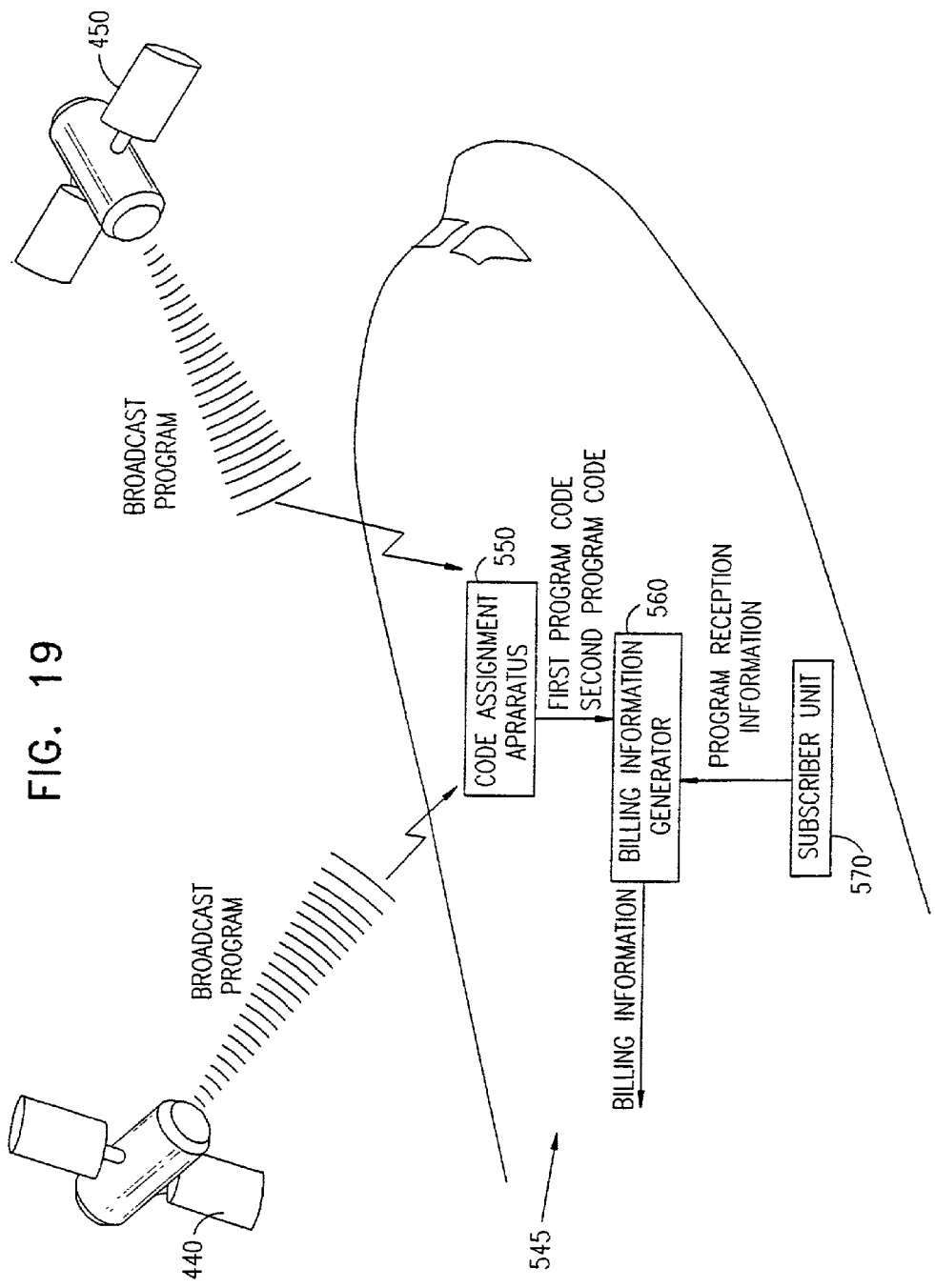
FIG. 19 is a simplified partly pictorial, partly block diagram illustration of a preferred embodiment of apparatus for carrying out the method of FIG. 15, constructed and operative in accordance with an alternative preferred embodiment of the present invention.

Reference is now made to FIG. 19, which is a simplified partly pictorial, partly block diagram illustration of a preferred embodiment of apparatus for carrying out the method of FIG. 15, constructed and operative in accordance with an alternative preferred embodiment of the present invention. It is appreciated that the apparatus of FIG. 19 is only one example of an apparatus for carrying out the method of FIG. 15.

The apparatus of FIG. 19 typically comprises apparatus 545 for providing billing information relating to a broadcast viewed within a moving vehicle. The elements comprised in the apparatus 545 are typically implemented in a combination of hardware and software. The elements comprised in the apparatus 545, and their typical relationship to the steps of the method of FIG. 15, typically include the following:

code assignment apparatus 550, typically receiving a first signal from the first satellite 440 and a second signal from the second satellite 450 and assigning first and second program codes thereto, typically implementing step 380; and a billing information generator 560 and a subscriber unit 570 providing program reception information to the billing information generator 560, together typically implementing steps 385 and 390.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only the by claims which follow:

What is claimed is:

1. A method for providing an electronic program guide within a moving vehicle, the vehicle moving from within a broadcast footprint of a satellite to a region outside the broadcast footprint, the method comprising:

receiving a satellite broadcast transmission transmitted from the satellite, the satellite broadcast transmission comprising at least one entertainment channel offering a program having an associated critical program time;

determining a current position of the moving vehicle;

computing a future position of the moving vehicle at the critical program time and determining whether the future position lies within the broadcast footprint, thus producing a result; and providing an electronic program guide comprising a plurality of entertainment channel offerings, the electronic program guide being customized based on the result, wherein the electronic program guide is customized to include the entertainment channel only if the result indicates that the future position lies within the broadcast footprint at the critical program time.

2. The method according to claim 1 and wherein the electronic program guide is customized to provide an indication that the program will not be available in its entirety only if the result indicates that the future position lies outside the broadcast footprint.

3. The method according to claim 2 and wherein the critical program time comprises a time before an ending time of the program.

4. The method according to claim 1 and wherein the critical program time comprises a time before an ending time of the program.

5. The method according to claim 1 and wherein the critical program time comprises a time before an ending time of the program.

6. The method according to claim 1 and wherein the moving vehicle comprises an airplane.

7. Apparatus for providing an electronic program guide within a moving vehicle, the vehicle moving from within a broadcast footprint of a satellite to a region outside the broadcast footprint, the apparatus comprising:

a receiver for receiving a satellite broadcast transmission transmitted from the satellite, the satellite broadcast transmission comprising at least one entertainment channel offering a program having an associated critical program time;

position determination apparatus for determining a current position of the moving vehicle;

future position computation apparatus for computing a future position of the moving vehicle at the critical program time and determining whether the future position lies within the broadcast footprint and producing a result; and entertainment apparatus for providing an electronic program guide comprising a plurality of entertainment channel offerings, the electronic program guide being customized based on the result, wherein the electronic program guide is customized to include the entertainment channel only if the result indicates that the future position lies within the broadcast footprint at the critical program time.

8. Apparatus according to claim 7 and wherein the electronic program guide is customized to, provide an indication that the program will not be available in its entirety only if the result indicates that the future position lies outside the broadcast footprint.

9. Apparatus according to claim 8 and wherein the critical program time comprises a time before an ending time of the program.

10. Apparatus according to claim 7 and wherein the critical program time comprises a time before an ending time of the program.

11. Apparatus according to claim 7 and wherein the critical program time comprises a time before an ending time of the program.

12. Apparatus according to claim 7 and wherein the moving vehicle comprises an airplane.

13. Apparatus for providing an electronic program guide within a moving vehicle, the vehicle moving from within a broadcast footprint of a satellite to a region outside the broadcast footprint, the apparatus comprising:

means for receiving a satellite broadcast transmission transmitted from the satellite, the satellite broadcast transmission comprising at least one entertainment channel offering a program having an associated critical program time;

means for determining a current position of the moving vehicle;

means for computing a future position of the moving vehicle at the critical program time and determining whether the future position lies within the broadcast footprint and producing a result; and means for providing an electronic program guide comprising a plurality of entertainment channel offerings, the electronic program guide being customized based on the result, wherein the electronic program guide is customized to include the entertainment channel only if the result indicates that the future position lies within the broadcast footprint at the critical program time.

14. Apparatus according to claim 13 and wherein the electronic program guide is customized to provide an indication that the program will not be available in its entirety only if the result indicates that the future position lies outside the broadcast footprint.

15. Apparatus according to claim 14 and wherein the critical program time comprises a time before an ending time of the program.

16. Apparatus according to claim 13 and wherein the critical program time comprises a time before an ending time of the program.

17. Apparatus according to claim 13 and wherein the critical program time comprises a time before an ending time of the program.

18. Apparatus according to claim 13 and wherein the moving vehicle comprises an airplane.

19. A method for providing an electronic program guide within a moving vehicle, the vehicle moving from within a broadcast footprint of a satellite to a region outside the broadcast footprint, the method comprising:

receiving a satellite broadcast transmission transmitted from the satellite, the satellite broadcast transmission comprising at least one entertainment channel offering a program having an associated critical program time;

determining a current position of the moving vehicle;

computing a future position of the moving vehicle at the critical program time and determining whether the future position lies within the broadcast footprint, thus producing a result; and providing an electronic program guide comprising a plurality of entertainment channel offerings, the electronic program guide being customized based on the result.

20. A method for providing an electronic program guide within a moving vehicle, the vehicle moving from within a broadcast footprint of a satellite to a region outside the broadcast footprint, the method comprising:

receiving a satellite broadcast transmission transmitted from the satellite, the satellite broadcast transmission comprising at least one entertainment channel offering a program having an associated critical program time;

determining a current position of the moving vehicle;

utilizing a direction and a speed of the moving vehicle to compute a future position of the moving vehicle at the critical program time and determining whether the future position lies within the broadcast footprint, thus producing a result; and providing an electronic program guide comprising a plurality of entertainment channel offerings, the electronic program guide being customized based on the result.

* * * * *